United States Patent
Oguchi et al.

(10) Patent No.: US 7,898,829 B2
(45) Date of Patent: Mar. 1, 2011

(54) RECTIFIER CIRCUIT AND THREE-PHASE RECTIFIER DEVICE

(75) Inventors: Kuniomi Oguchi, Ibaraki (JP); Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 321 days.

(21) Appl. No.: 12/087,344

(22) PCT Filed: Dec. 14, 2006

(86) PCT No.: PCT/JP2006/324941
§ 371 (c)(1),
(2), (4) Date: Jul. 2, 2008

(87) PCT Pub. No.: WO2007/077717
PCT Pub. Date: Jul. 12, 2007

(65) Prior Publication Data
US 2009/0067206 A1 Mar. 12, 2009

(30) Foreign Application Priority Data
Jan. 5, 2006 (JP) .................................. 2006-000513

(51) Int. Cl.
H02M 1/12 (2006.01)
H02M 7/08 (2006.01)
(52) U.S. Cl. ............................................ 363/44; 363/67
(58) Field of Classification Search .................. 323/222, 323/225; 363/44, 45, 65, 67, 69, 124, 125, 363/126
See application file for complete search history.

(56) References Cited

U.S. PATENT DOCUMENTS

| | | | |
|---|---|---|---|
| 5,808,882 A | 9/1998 | Mochikawa et al. | |
| 5,982,648 A * | 11/1999 | Wang | 363/70 |
| 6,122,183 A * | 9/2000 | He et al. | 363/44 |

FOREIGN PATENT DOCUMENTS

| | | |
|---|---|---|
| JP | 59-15475 B2 | 4/1984 |
| JP | 9-182441 A | 7/1997 |
| JP | 10-66333 A | 3/1998 |
| JP | 10-323045 A | 12/1998 |

OTHER PUBLICATIONS

Matsumoto, "Twelve-pulse Converter with Autotransformer Connection," The Institute of Electrical Engineers of Japan, Transactions B, vol. 96, No. 8, pp. 406-412 (1976).
Choi et al., "A new active interphase reactor for 12-pulse rectifiers provides clean power utility interface," IEEE Transactions on Industry Applications, vol. 32, No. 6, pp. 1304-1311, (1996).
Hirasa, "Power Electronics," Kyoritsu Shuppan Co., Ltd., pp. 77-90, (1992).
Hahn et al., "A Wide Input Range Active Multi-pulse Three-phase Rectifier for Utility Interface of Power Electronic Converters", Proc. of the 2002 Industrial Application Society—Annual Meeting, pp. 2514-2519.
Mendes et al., "A 12 kW Three-Phase Low THD Rectifier With High-Frequency Isolation and Regulated DC Output", IEEE Transactions on Power Electronics, vol. 19, No. 2, pp. 371-377 (2004).

* cited by examiner

Primary Examiner — Gary L Laxton
(74) Attorney, Agent, or Firm — Birch, Stewart, Kolasch & Birch, LLP

(57) ABSTRACT

Choppers are provided respectively in the output stages of two diode bridges, and their output sides are connected in parallel to a smoothing capacitor. By controlling the operations of the two choppers, the currents which are allowed to be inputted to the diode bridges are made triangular waves of mutually opposite phases, or middle-phase waveforms of three phases.

10 Claims, 15 Drawing Sheets

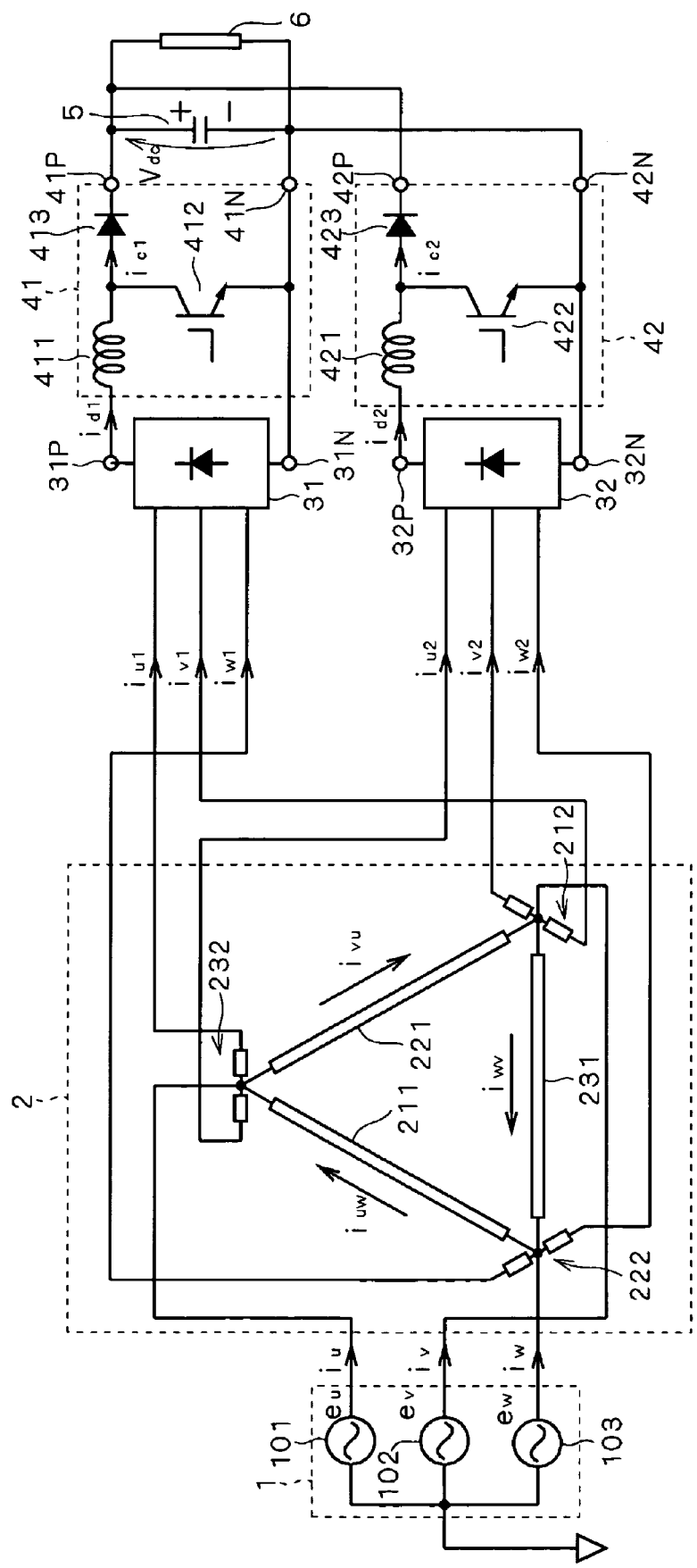
F I G . 1

F I G . 9
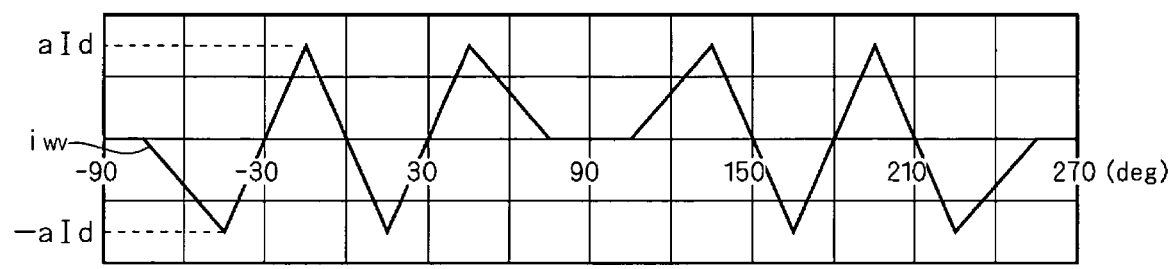
F I G . 1 0
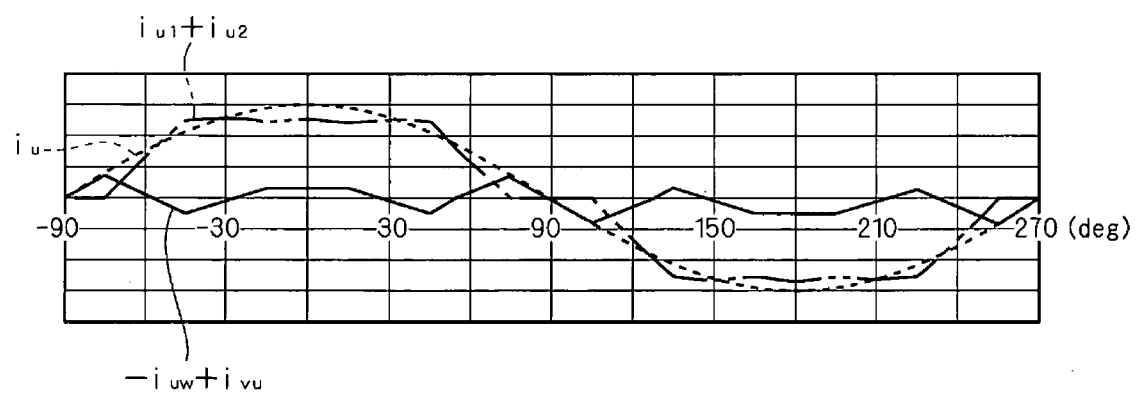

RECTIFIER CIRCUIT AND THREE-PHASE RECTIFIER DEVICE

TECHNICAL FIELD

The present invention relates to rectification techniques, and particularly to a field called multiple rectification.

BACKGROUND ART

With the widespread use of inverter equipment, increasing amounts of harmonics are generated due to the loads of rectifiers. This increases the possibility of overheating or breakage of phase advance capacitors and transformers of power systems due to the harmonic current. Therefore, there is a demand to suppress harmonics of the rectified current obtained on the basis of a three-phase power supply (for example, JIS standard JISC61000-3-2).

In a common three-phase rectifier circuit, six steps appear in one period of the current waveform. In general, with an n-step current waveform, the lowest-order harmonic is of the (n−1)th. Then, the harmonic content with respect to the fundamental wave is 1/n, and so the fifth and seventh harmonics significantly appear.

Accordingly, techniques for suppressing harmonics are proposed, for example by Non-Patent Documents 1 and 2 and Patent Document 1. These schemes adopt a technique called multiple rectification, and Non-Patent Documents 1 and 2 disclose techniques in which each of polyphase currents generates 12 pulses in one period, and two rectifier circuits are connected in parallel to the load (this technique is hereinafter referred to as "12-pulse rectification"). Also, Patent Document 1 discloses a technique in which each of polyphase currents generates 18 pulses in one period, and three rectifier circuits are connected in parallel to the load (this technique is hereinafter referred to as "18-pulse rectification"). Adopting these techniques eliminates the fifth, seventh, or eleventh, thirteenth harmonic components.

Non-Patent Document 2 provides an additional coil to an interphase reactor connecting the outputs of two rectifier circuits together, in order to improve the current waveform in 12-pulse rectification. Alternating current is applied to the coil, so as to inject a current into the interphase reactor. This improves the current waveform inputted to the transformer for obtaining the 12 pulses of current.

However, injecting a current into an interphase reactor with an additional coil, as described in Non-Patent Document 2, requires applying a complicated waveform to the coil. Non-Patent Document 2 avoids such a complicated waveform, and applies a triangular wave to the coil, but then distortion remains in the input current as a natural result. Also, the device for injecting current into the interphase reactor is configured complicatedly, or a separate voltage source is required.

Choppers described later in the preferred embodiments are introduced in Non-Patent Document 3.

Patent Document 1: Japanese Patent Laid Open No. 59-15475 (1984)

Non-Patent Document 1: Hisao Matsumoto, "Twelve-pulse Converter with Autotransformer Connection", The Institute of Electrical Engineers of Japan, Transactions B, vol. 96, no. 8, pp. 406-412

Non-Patent Document 2: Sewan Choi, P. N. Enjeti, H. Lee and I. L. Pitel: "A new active interphase reactor for 12-pulse rectifiers provides clean power utility interface", IEEE Trans. Ind. Applicat., vol. 32, no. 6, pp. 1304-1311 (1996)

Non-Patent Document 3: Takao Hirasa, "Power Electronics", Kyoritsu Shuppan Co., Ltd, pp. 77-90, 1992

DISCLOSURE OF THE INVENTION

The present invention has been made by considering the problems above, and an object of the present invention is to provide a technique by which currents flowing in a transformer for outputting plural sets of three-phase currents given to a multiple rectifier circuit are easily made close to sinusoidal waves.

According to a first aspect of the rectifier circuit of the present invention, a rectifier circuit comprises: a first three-phase diode bridge (31) having three input ends (31U, 31V, 31W) and a pair of output ends (31P, 31N), said first three-phase diode bridge applying full-wave rectification to currents ($i_{u1}$, $i_{v1}$, $i_{w1}$) inputted to said input ends to obtain a first rectified current ($i_{d1}$), and outputting said first rectified current from one (31P) of said output ends; a first chopper (41; 43) having a pair of output ends (41P, 41N; 43P, 43N), said first chopper performing a first chopper operation to receive a current having a fundamental frequency of a first value as said first rectified current; a second three-phase diode bridge (32) having three input ends (32U, 32V, 32W) and a pair of output ends (32P, 32N), said second three-phase diode bridge applying full-wave rectification to currents ($i_{u2}$, $i_{v2}$, $i_{w2}$) inputted to said input ends to obtain a second rectified current ($i_{d2}$), and outputting said second rectified current from one (32P) of said output ends; and a second chopper (42; 44) having a pair of output ends (42P, 42N; 44P, 44N), said second chopper performing a second chopper operation to receive a current having a fundamental frequency of said first value as said second rectified current. Said pair of output ends of said first chopper and said pair of output ends of said second chopper are connected in parallel.

According to a second aspect of the rectifier circuit of the present invention, the rectifier circuit of the first aspect further comprises an interphase reactor (71) which is connected to said input ends of said first three-phase diode bridge (31) and in which the currents ($i_{u1}$, $i_{v1}$, $i_{w1}$) inputted to said input ends flow.

According to a third aspect of the rectifier circuit of the present invention, the rectifier circuit of the first aspect or the second aspect further comprises an interphase reactor (72) which is connected between said first three-phase diode bridge and said first chopper and in which said first rectified current ($i_{d1}$) flows.

According to a fourth aspect of the rectifier circuit of the present invention, in the rectifier circuit of the first aspect, said first chopper (43) comprises: a first inductor (411) in which said first rectified current ($i_{d1}$) flows; a first diode (413) having an anode connected to said one (31P) of said output ends of said first three-phase diode bridge (31) through said first inductor, and a cathode connected to one (43P) of said output ends of said first chopper; a second inductor (431) connected to the other (31N) of said output ends of said first three-phase diode bridge; a second diode (434) having a cathode connected to said other (31N) of said output ends of said first three-phase diode bridge through said second inductor, and an anode connected to the other (43N) of said output ends of said first chopper; and a switching element (412) having a first end connected to the anode of said first diode and a second end connected to the cathode of said second diode, said switching element opening/closing between said first end and said second end. Said second chopper (44) comprises: a third inductor (421) in which said second rectified current ($i_{d2}$) flows; a third diode (423) having an anode connected to said one (32P) of said output ends of said second three-phase diode bridge (32) through said third inductor, and a cathode connected to one (44P) of said output ends of said second chopper; a fourth inductor (441) connected to the other (32N) of said output ends of said second three-phase diode bridge; a fourth diode (444) having a cathode connected to said other (32N) of said output ends of said second three-phase diode bridge through said fourth inductor, and an anode connected to the other (44N) of said output ends of said second chopper; and a switching element (422) having a first end connected to the anode of said third diode and a second end connected to the cathode of said fourth diode, said switching element opening/closing between its said first end and said second end.

According to a fifth aspect of the rectifier circuit of the present invention, in the rectifier circuit of any of the first to fourth aspects, said first chopper and said second chopper are both step-up choppers.

According to a sixth aspect of the rectifier circuit of the present invention, in the rectifier circuit of any of the first to fourth aspects, said first chopper operation is controlled by pulse width modulation on the basis of a first modulation wave having a carrier frequency, and said second chopper operation is controlled by pulse width modulation on the basis of a second modulation wave having said carrier frequency and being in opposite phase to said first modulation wave.

According to a seventh aspect of the rectifier circuit of the present invention, the rectifier circuit of any of the first to sixth aspects further comprises a smoothing capacitor (5) connected in parallel to said output ends of said first chopper and said output ends of said second chopper.

According to an eighth aspect of the rectifier circuit of the present invention, in the rectifier circuit of any of the first to seventh aspects, first three-phase alternating currents ($i_{u1}$, $i_{v1}$, $i_{w1}$) are inputted to said input ends (31U, 31V, 31W) of said first three-phase diode bridge (31), a fundamental frequency of said first three-phase alternating currents is a second value that is ⅙ of said first value and said first three-phase alternating currents having mutual phase differences of 120 degrees at the fundamental frequency, and second three-phase alternating currents ($i_{u2}$, $i_{v2}$, $i_{w2}$) are inputted to said input ends (32U, 32V, 32W) of said second three-phase diode bridge (32), a fundamental frequency of said second three-phase alternating currents is said second value and having mutual phase differences of 120 degrees at the fundamental frequency, and wherein there is a phase difference of 30 degrees at the fundamental frequency between said first three-phase alternating currents and said second three-phase alternating currents, and wherein said first three-phase alternating currents and said second three-phase alternating currents each have a waveform which: (i) exhibits a crest in each of first and second sections both of which continue in correspondence with a phase length of 60 degrees at the fundamental frequency; (ii) exhibits a trough in each of continuous two 60-degree sections, in each of third and fourth sections both of which continue in correspondence with a phase length of 60 degrees at the fundamental frequency; and (iii) exhibits a flatter form as compared with said crests and troughs, in each of fifth and sixth sections which correspond to a phase length of 60 degrees at the fundamental frequency and which are separated by said first and second sections or by said third and fourth sections.

According to a ninth aspect of the rectifier circuit of the present invention, in the rectifier circuit of the eighth aspect, the waveform of each of said first three-phase alternating currents and said second three-phase alternating currents exhibits a triangular wave in said first to fourth sections.

According to a tenth aspect of the rectifier circuit of the present invention, in the rectifier circuit of the eighth aspect, in said first to fourth sections, the waveform of each of said first three-phase alternating currents and said second three-phase alternating currents exhibits a waveform formed by combining a curve that is similar to a waveform that a sinusoidal wave exhibits from 0 degree to 30 degrees and a waveform that is left-right symmetrical to the curve.

According to a first aspect of the three-phase rectifier device of the present invention, a three-phase rectifier device comprises: the rectifier circuit according to any of the first to tenth aspects of the present invention; and a three-phase transformer (2) that receives three-phase currents ($i_u$, $i_v$, $i_w$), a fundamental frequency of said three-phase currents is a second value that is ⅙ of said first value and said three-phase currents having mutual phase differences of 120 degrees at the fundamental frequency, and that outputs first three-phase alternating currents ($i_{u1}$, $i_{v1}$, $i_{w1}$) having phase differences of 15 degrees at the fundamental frequency respectively from said three-phase currents, and that also outputs second three-phase alternating currents ($i_{u2}$, $i_{v2}$, $i_{w2}$) having phase differences of 30 degrees at the fundamental frequency from said first three-phase alternating currents.

According to a second aspect of the three-phase rectifier device of the present invention, in the three-phase rectifier device of the first aspect, said three-phase transformer (2) comprises three autotransformers (21, 22, 23) each having a primary winding (211, 221, 232) and a secondary winding (212, 222, 232) coupled with said primary winding and having a center tap, said primary windings of said three autotransformers are delta-connected, and said center tap of each said autotransformer is connected to a connection point (U, V, W) that connects a pair of said primary windings other than said primary winding coupled with said secondary winding to which said center tap belongs.

According to a third aspect of the three-phase rectifier device of the present invention, in the three-phase rectifier device of the first aspect, said three-phase transformer (2) comprises: three primary windings (211, 221, 231) corresponding to respective phases; and three secondary windings (212, 222, 232) coupled with all of said primary windings and each having a center tap, and wherein said primary windings are delta-connected, and said three center taps are individually connected to three connection points (U, V, W) at which a pair of said primary windings are connected together.

According to the first aspect, particularly the eighth to tenth aspects, of the rectifier circuit of the present invention, when a smoothing capacitor is connected in parallel to the pair of output ends of the first chopper and the pair of output ends of the second chopper, and first three-phase alternating currents having a fundamental frequency of a second value that is ⅙ of the first value are provided to the first three-phase diode bridge, and second three-phase alternating currents having phase differences of 30 degrees from the first three-phase alternating currents are provided to the second three-phase diode bridge, then the currents flowing in the transformer for outputting the first and second three-phase alternating currents is made close to sinusoidal waves. Also, the dc component of voltage can be controlled easily because the control is performed by using choppers.

According to the second aspect and the third aspect of the rectifier circuit of the present invention, even when a neutral point corresponding to the first three-phase alternating currents and a neutral point corresponding to the second three-phase alternating currents are not insulated and zero-phase voltage having a fundamental frequency of a third value that is ½ of the first value is generated, it is possible to suppress current flowing on the basis of the zero-phase voltage.

According to the fourth aspect of the rectifier circuit of the present invention, no interphase reactor is required.

According to the fifth aspect of the rectifier circuit of the present invention, the dc component of voltage is controlled, and dc voltage higher than the peak value of the power-supply voltage is obtained.

According to the sixth aspect of the rectifier circuit of the present invention, ripple having the carrier frequency is reduced.

According to the seventh aspect of the rectifier circuit of the present invention, the output voltage is smoothed.

According to the first aspect to the third aspect of the three-phase rectifier device of the present invention, it is possible to provide appropriate inputs respectively to the first three-phase diode bridge and the second three-phase diode bridge.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a circuit diagram used to describe a first preferred embodiment of the present invention.

FIG. 9 is a graph illustrating the waveform of current.

FIG. 10 is a graph illustrating the waveforms of currents.

BEST MODE FOR CARRYING OUT THE INVENTION

First Preferred Embodiment

Figure 2:
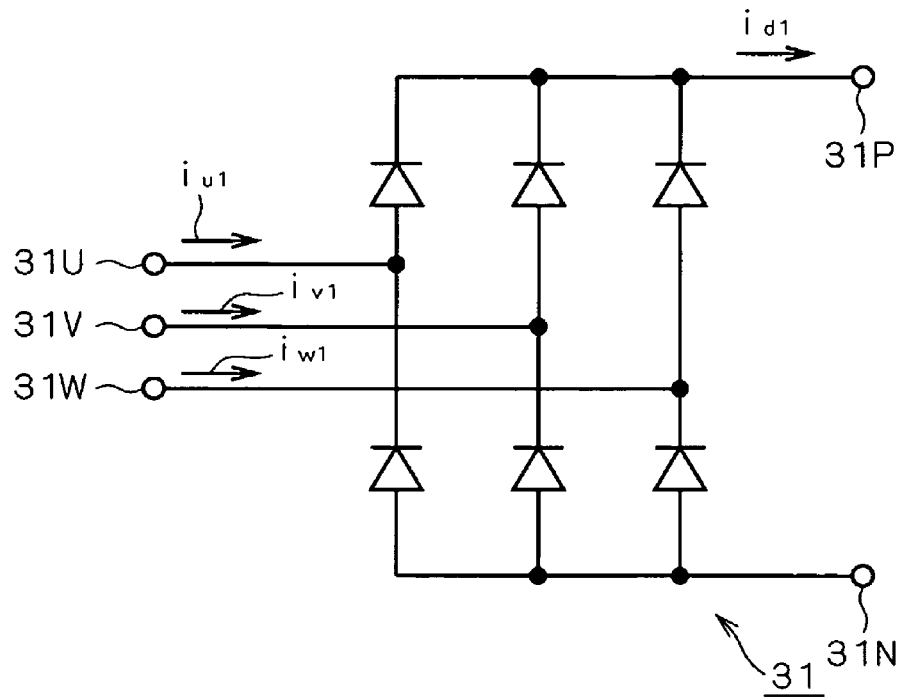
FIG. 2 is a circuit diagram illustrating the configuration of a first three-phase diode bridge.

FIG. 1 is a circuit diagram used to describe a first preferred embodiment of the present invention. A first three-phase diode bridge 31, a second three-phase diode bridge 32, a first chopper 41, and a second chopper 42 constitute a rectifier circuit. The rectifier circuit may be grasped as including a smoothing capacitor 5. A three-phase transformer 2 constitutes a three-phase rectifier device together with the rectifier circuit.

The three-phase transformer 2 receives three-phase currents $i_u$, $i_v$, $i_w$ from a three-phase power supply 1, and outputs first three-phase alternating currents $i_{u1}$, $i_{v1}$, $i_{w1}$ and second three-phase alternating currents $i_{u2}$, $i_{v2}$, $i_{w2}$.

The three-phase power supply 1 includes a U-phase power supply 101, a V-phase power supply 102, and a W-phase power supply 103, respectively generating three-phase voltages $e_u$, $e_v$, $e_w$. The U-phase power supply 101, the V-phase power supply 102, and the W-phase power supply 103 respectively supply the three-phase currents $i_u$, $i_v$, $i_w$.

The first three-phase diode bridge 31 receives the three-phase currents $i_{u1}$, $i_{v1}$, $i_{w1}$, and outputs a first rectified current $i_{d1}$. The second three-phase diode bridge 32 receives the three-phase currents $i_{u2}$, $i_{v2}$, $i_{w2}$, and outputs a second rectified current $i_{d2}$.

FIG. 2 is a circuit diagram illustrating the configuration of the first three-phase diode bridge 31. The first three-phase diode bridge 31 has input ends 31U, 31V, 31W and output ends 31P and 31N. It applies full-wave rectification to the currents inputted to the input ends 31U, 31V, 31W, and outputs the first rectified current $i_{d1}$ from the output end 31P. In this preferred embodiment, the three-phase currents $i_{u1}$, $i_{v1}$, $i_{w1}$ are inputted to the input ends 31U, 31V, 31W.

Figure 3:
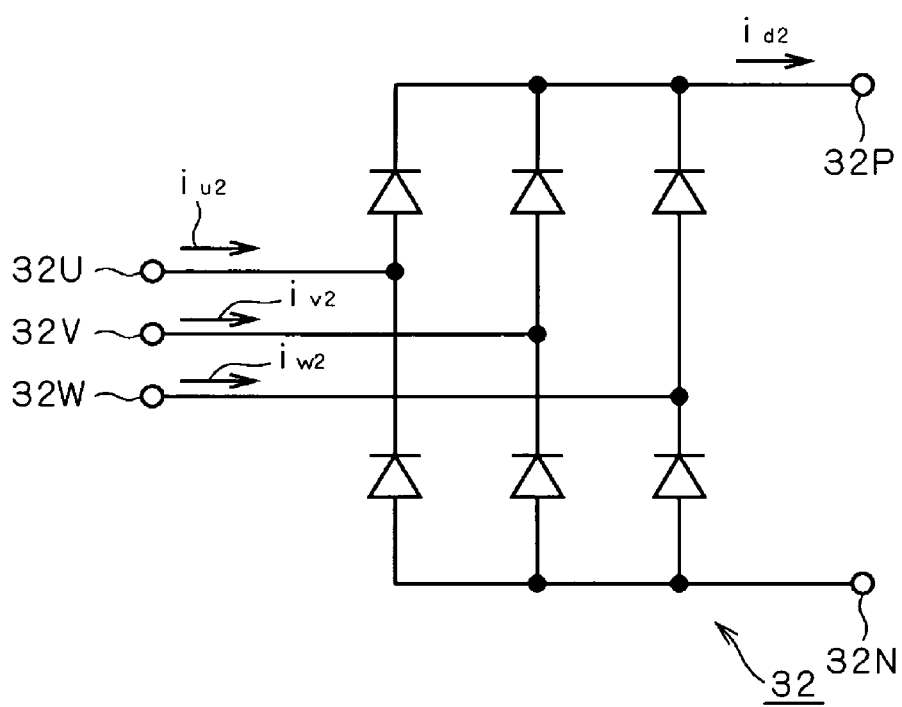
FIG. 3 is a circuit diagram illustrating the configuration of a second three-phase diode bridge.

FIG. 3 is a circuit diagram illustrating the configuration of the second three-phase diode bridge 32. The second three-phase diode bridge 32 has input ends 32U, 32V, 32W and output ends 32P and 32N. It applies full-wave rectification to the currents inputted to the input ends 32U, 32V, 32W, and outputs the second rectified current $i_{d2}$ from the output end 32P. In this preferred embodiment, the three-phase currents $i_{u2}$, $i_{v2}$, $i_{w2}$ are inputted to the input ends 32U, 32V, 32W.

The first chopper 41 performs a first chopper operation to receive the first rectified current $i_{d1}$ as a current whose fundamental frequency has a first value. Then it outputs part of the first rectified current id, as a first chopper current $i_{c1}$. The second chopper 42 performs a second chopper operation to receive the second rectified current $i_{d2}$ as a current whose fundamental frequency has the first value. Then it outputs part of the second rectified current $i_{d2}$ as a second chopper current $i_{c2}$.

In this preferred embodiment, the first chopper 41 and the second chopper 42 are step-up choppers. Specifically, the first chopper 41 has output ends 41P and 41N, and outputs the first chopper current $i_{c1}$ from the output end 41P. The first chopper 41 has an inductor 411 that is connected to the output end 31P of the first three-phase diode bridge 31 and receives the first rectified current $i_{d1}$. The collector of an insulated gate bipolar transistor (IGBT) 412 and the anode of a diode 413 are connected in common, and connected to the output end 31P through the inductor 411. The cathode of the diode 413 is connected to the output end 41P. The output ends 31N and 41N are connected in common to the emitter of the IGBT 412. The IGBT 412 functions as a switching element that opens/closes between its collector and emitter.

In correspondence with the output ends 41P and 41N, inductor 411, IGBT 412, and diode 413, the second chopper 42 includes output ends 42P and 42N, an inductor 421, an IGBT 422, and a diode 423, and the second chopper 42 outputs the second chopper current $i_{c2}$ from the output end 42P.

The output ends 41P and 41N are connected in parallel to the output ends 42P and 42N, and also in parallel to the smoothing capacitor 5. A load 6 is connected in parallel to the smoothing capacitor 5, and supplied with the both-end voltage $v_{dc}$ of the smoothing capacitor 5.

As described above, the first chopper 41 and the second chopper 42 have their output ends connected in parallel with the smoothing capacitor 5, and so the current of the first chopper current $i_{c1}$ and the second chopper current $i_{c2}$ are continuous to function as a current source. Also, by adopting step-up type as the first chopper 41 and the second chopper 42, it is possible to obtain dc voltage that is higher than the peak values of the three-phase voltages $e_u$, $e_v$, $e_w$. Also, by providing the smoothing capacitor 5, it is possible to smooth the output voltage.

Figure 4:
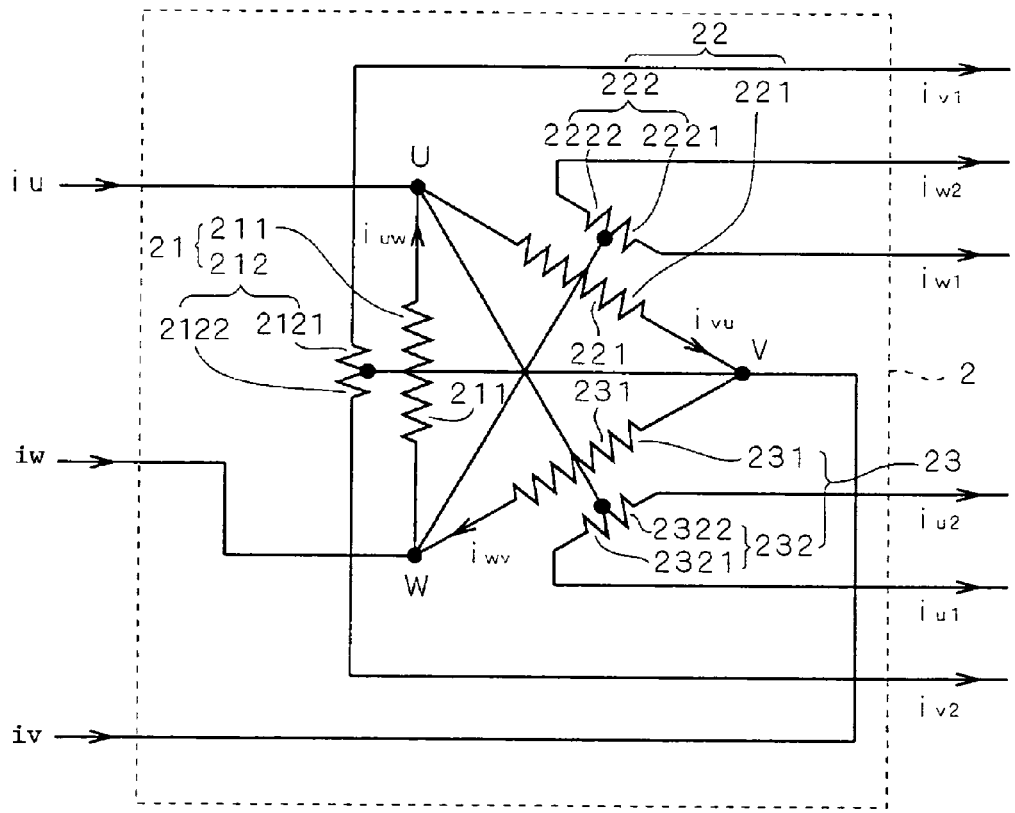
FIG. 4 is a circuit diagram illustrating the details of a three-phase transformer.

FIG. 4 is a circuit diagram illustrating the details of the three-phase transformer 2, which is illustrated in Non-Patent Document 1, for example. The three-phase transformer 2 includes three autotransformers 21, 22, 23. The autotransformer 21 has a primary winding 211 connected between a U-phase input end U and a W-phase input end W, and a secondary winding 212 coupled with it and having a center tap. The secondary winding 212 is divided into secondary windings 2121 and 2122 by the center tap. The center tap is connected to a V-phase input end V. While the number of turns of the primary winding 211 is $n_1$, the number of turns of both of the secondary windings 2121 and 2122 is $n_2$, and the value shown by Expression (1) is adopted as the ratio.

[Expression 1]

$$\frac{n_2}{n_1} = a = \frac{\tan(\pi/12)}{\sqrt{3}} \quad (1)$$

In the same way, the autotransformer 22 has a primary winding 221 connected between the U-phase input end U and the V-phase input end V, and a secondary winding 222 coupled with it and having a center tap. The secondary winding 222 is divided into secondary windings 2221 and 2222 by the center tap. The center tap is connected to the W-phase input end W. While the number of turns of the primary winding 221 is $n_1$, the number of turns of both of the secondary windings 2221 and 2222 is $n_2$.

The autotransformer 23 has a primary winding 231 connected between the W-phase input end W and the V-phase input end V, and a secondary winding 232 coupled with it and having a center tap. The secondary winding 232 is divided into secondary windings 2321 and 2322 by the center tap. The center tap is connected to the U-phase input end U. While the number of turns of the primary winding 231 is $n_1$, the number of turns of both of the secondary windings 2321 and 2322 is $n_2$.

The primary windings 211, 221 and 231 are delta-connected. The three-phase currents $i_u$, $i_v$, $i_w$ from the three-phase power supply 1 flow respectively into the U-phase input end U, the V-phase input end V, and the W-phase input end W. On the other hand, a current $i_{uw}$ flows in the primary winding 211 from the W-phase input end W to the U-phase input end U, a current $i_{vu}$ flows in the primary winding 221 from the U-phase input end U to the V-phase input end V, and a current $i_{wv}$ flows in the primary winding 231 from the V-phase input end V to the W-phase input end W. Expression (2) holds about the currents $i_{wv}$, $i_{uw}$, $i_{vu}$, flowing in the primary windings 231, 211 221.

[Expression 2]

$$\left. \begin{array}{l} i_{wv} = a(i_{u2} - i_{u1}) \\ i_{uv} = a(i_{v2} - i_{v1}) \\ i_{vu} = a(i_{w2} - i_{w1}) \end{array} \right\} \quad (2)$$

The currents $i_{v1}$ and $i_{v2}$ are outputted from the center tap of the secondary winding 212 respectively through the secondary windings 2121 and 2122, the currents $i_{w1}$ and $i_{w2}$ are outputted from the center tap of the secondary winding 222 respectively through the secondary windings 2221 and 2222, and the currents $i_{u1}$ and $i_{u2}$ are outputted from the center tap of the secondary winding 232 respectively through the secondary windings 2321 and 2322. Accordingly, Expression (3) holds.

[Expression 3]

$$\left. \begin{array}{l} i_u = i_{u1} + i_{u2} - i_{uw} + i_{vu} \\ i_v = i_{v1} + i_{v2} - i_{vu} + i_{wv} \\ i_w = i_{w1} + i_{w2} - i_{wv} + i_{uw} \end{array} \right\} \quad (3)$$

Figure 5:
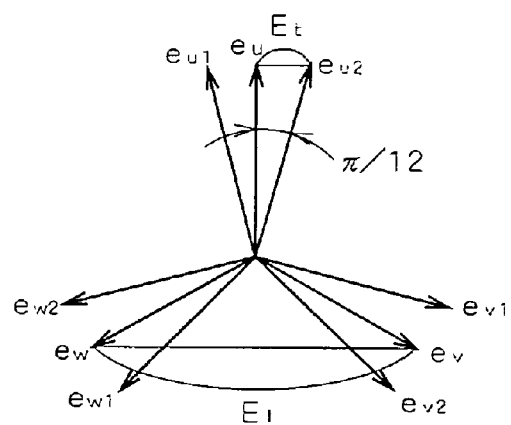
FIG. 5 is a phasor diagram illustrating voltages in individual parts of the three-phase transformer.

FIG. 5 is a phasor diagram illustrating the voltages in individual parts of the three-phase transformer 2, which is illustrated in Non-Patent Document 1. The three-phase voltages $e_u$, $e_v$, $e_w$ have phase differences of 120 degrees relative to each other, and the phase lags in this order. The voltage $e_{u1}$ on the side opposite to the center tap of the secondary winding 2321 leads in phase by 15 degrees with respect to the voltage $e_u$, the voltage $e_{v1}$ on the side opposite to the center tap of the secondary winding 2121 leads in phase by 15 degrees with respect to the voltage $e_v$, and the voltage $e_{w1}$ on the side opposite to the center tap of the secondary winding 2221 leads in phase by 15 degrees with respect to the voltage $e_w$. Also, the voltage ea on the side opposite to the center tap of the secondary winding 2322 lags in phase by 15 degrees with respect to the voltage $e_u$, the voltage $e_{v2}$ on the side opposite to the center tap of the secondary winding 2122 lags in phase by 15 degrees with respect to the voltage $e_v$, and the voltage $e_{w2}$ on the side opposite to the center tap of the secondary winding 2222 lags in phase by 15 degrees with respect to the voltage $e_w$.

With the autotransformer 23, the absolute value $E_1$ of the voltage applied to the primary winding 231 is the absolute value of the difference between the voltage $e_v$ and the voltage $e_w$, and a voltage having an absolute value $a \cdot E_1$ is excited in the secondary winding 2322. Accordingly, because its center tap is connected to the U-phase input end U and the voltage $e_u$ is applied, the absolute value $E_t$ of the difference between the voltage $e_{u2}$ and the voltage $e_u$ is equal to the absolute value $a \cdot E_1$. The same is true for the other phases.

Such voltage relations are determined by the relative coupling and connection of the autotransformers 21, 22 and 23. Accordingly, as long as the three-phase voltages $e_u$, $e_v$, $e_w$ are stable, the voltage relations are maintained regardless of the waveforms of the currents $i_{u1}$, $i_{v1}$, $i_{w1}$, $i_{u2}$, $i_{v2}$, $i_{w2}$. In other words, by controlling the current waveforms, there is room to improve the waveforms of the three-phase currents $i_u$, $i_v$, $i_w$ inputted to the three-phase transformer 2 from the three-phase power supply 1. The currents $i_{u1}$, $i_{v1}$, $i_{w1}$, $i_{u2}$, $i_{v2}$, $i_{w2}$ can be controlled on the basis of how they are inputted with the operations of the first chopper 41 and the second chopper 42.

Now, a desired waveform of the currents $i_{u1}$, $i_{v1}$, $i_{w1}$, $i_{u2}$, $i_{v2}$, $i_{w2}$ will be illustrated first, and a description will be made to illustrate that such currents can be inputted on the basis of the operations of the first chopper 41 and the second chopper 42.

Figure 6:
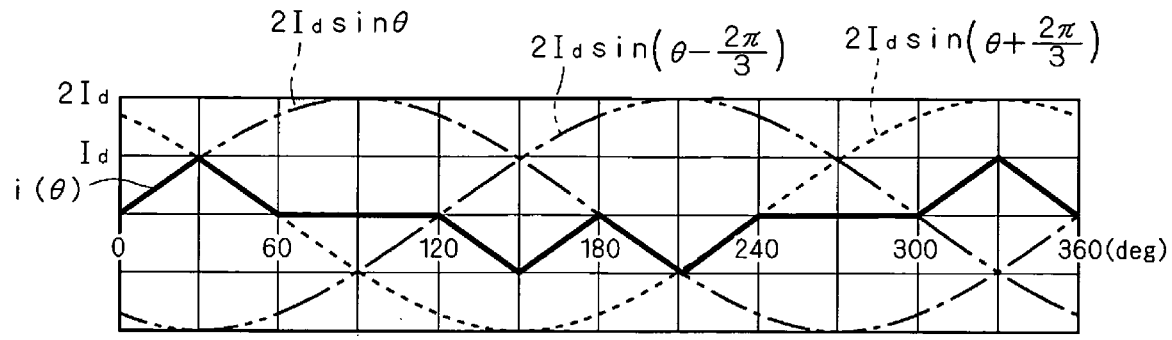
FIG. 6 is a graph illustrating desired waveforms of currents.

FIG. 6 is a graph illustrating a desired waveform $i(\theta)$ of the currents $i_{u1}$, $i_{v1}$, $i_{w1}$, $i_{u2}$, $i_{v2}$, $i_{w2}$. Where, the phase of the angle $\theta$ differs depending on the six currents. Specifically, the waveform $i(\theta)$ is represented by Expression (4).

[Expression 4]

$$\left. \begin{array}{l} 0 \le \theta \le \frac{\pi}{6}, \pi \le \theta \le \frac{7\pi}{6} : i(\theta) = 2I_d \sin\theta \\ \frac{\pi}{6} \le \theta \le \frac{\pi}{3}, \frac{7\pi}{6} \le \theta \le \frac{4\pi}{3} : i(\theta) = 2I_d \sin\left(\theta + \frac{2\pi}{3}\right) \\ \frac{\pi}{3} \le \theta \le \frac{2\pi}{3}, \frac{4\pi}{3} \le \theta \le \frac{5\pi}{3} : i(\theta) = 0 \\ \frac{2\pi}{3} \le \theta \le \frac{5\pi}{6}, \frac{5\pi}{3} \le \theta \le \frac{11\pi}{6} : i(\theta) = -2I_d \sin\left(\theta - \frac{2\pi}{3}\right) \\ \frac{5\pi}{6} \le \theta \le \pi, \frac{11\pi}{6} \le \theta \le 2\pi : i(\theta) = -2I_d \sin\theta \end{array} \right\} \quad (4)$$

The waveform $i(\theta)$ can be roughly explained as shown below:

(i) It exhibits a crest in each of the first and second sections (the section from $5\pi/3$ to $2\pi$ and the section from 0 to $\pi/3$) both of which continue in correspondence with a phase length of 60 degrees at the fundamental frequency;

(ii) It exhibits a trough in each of continuous two 60-degree sections, in each of the third and fourth sections (the section from $2\pi/3$ to $\pi$ and the section from $\pi$ to $4\pi/3$) both of which continue in correspondence with a phase length of 60 degrees at the fundamental frequency; and (iii) It exhibits a flatter form as compared with the crests and troughs, in each of the fifth and sixth sections (the section from $\pi/3$ to $2\pi/3$ and the section from $4\pi/3$ to $5\pi/3$) which correspond to a phase length of 60 degrees at the fundamental frequency and which are separated by the first and second sections or by the third and fourth sections.

Expression (5) is obtained by applying Fourier expansion to Expression (4).

[Expression 5]

$$\left. \begin{array}{l} i(\theta) = \frac{I_d}{\sqrt{3}} \cos\theta + \sum_{n=2}^{\infty} I_{mn} \cos n\theta \\ I_{mn} = \frac{32}{(n^2-1)\pi} I_d \sin\frac{n\pi}{2} \sin\frac{n\pi}{3} \sin\frac{(n+1)\pi}{12} \sin\frac{(n-1)\pi}{12} \end{array} \right\} \quad (5)$$

As can be seen from Expression (5), the waveform $i(\theta)$ has a fundamental component of $\cos\theta$, and the components of even order, (3 n)th, (12 n+1)th, and (12 n−1)th are zero. Accordingly, it is seen that the main harmonic components are (6 m+1)th and (6 m−1)th, with an odd number m.

Considering the phase differences about the angle $\theta$ of Expression (5), the currents $i_{u1}$, $i_{v1}$, $i_{w1}$, $i_{u2}$, $i_{v2}$, $i_{w2}$ are shown by Expression (6). Where the angular frequency of the three-phase voltages $e_u$, $e_v$, $e_w$ is taken as $\omega$, and the voltage $e_u$ is assumed to be proportional to the sinusoidal function $\sin(\omega t)$ of time t.

[Expression 6]

$$\left. \begin{array}{l} i_{u1} = I_m \cos\left(\omega t + \frac{\pi}{12}\right) + \sum_{n=2}^{\infty} I_{mn} \cos n\left(\omega t + \frac{\pi}{12}\right) \\ i_{u2} = I_m \cos\left(\omega t - \frac{\pi}{12}\right) + \sum_{n=2}^{\infty} I_{mn} \cos n\left(\omega t - \frac{\pi}{12}\right) \\ i_{v1} = I_m \cos\left(\omega t + \frac{\pi}{12} - \frac{2\pi}{3}\right) + \sum_{n=2}^{\infty} I_{mn} \cos n\left(\omega t + \frac{\pi}{12} - \frac{2\pi}{3}\right) \\ i_{v2} = I_m \cos\left(\omega t - \frac{\pi}{12} - \frac{2\pi}{3}\right) + \sum_{n=2}^{\infty} I_{mn} \cos n\left(\omega t - \frac{\pi}{12} - \frac{2\pi}{3}\right) \\ i_{w1} = I_m \cos\left(\omega t + \frac{\pi}{12} + \frac{2\pi}{3}\right) + \sum_{n=2}^{\infty} I_{mn} \cos n\left(\omega t + \frac{\pi}{12} + \frac{2\pi}{3}\right) \\ i_{w2} = I_m \cos\left(\omega t - \frac{\pi}{12} + \frac{2\pi}{3}\right) + \sum_{n=2}^{\infty} I_{mn} \cos n\left(\omega t - \frac{\pi}{12} + \frac{2\pi}{3}\right) \end{array} \right\} \quad (6)$$

Figure 7:
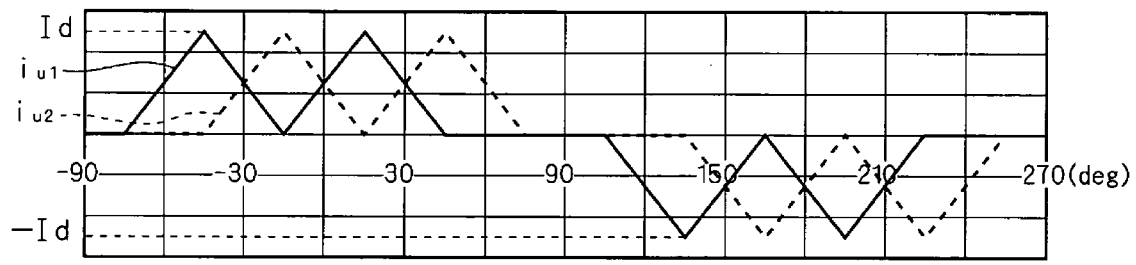
FIG. 7 is a graph illustrating the waveforms of currents.

FIG. 7 is a graph illustrating the currents $i_{u1}$ and $i_{u2}$. The graph is based on the phase of the voltage $e_u$. The minimum value of each is $-I_d$ and the maximum value is $I_d$. Due to the phase relation of voltages shown in the phasor diagram of FIG. 5, the currents $i_{u1}$ and $i_{u2}$ respectively lead in phase by 15 degrees and lag in phase by 15 degrees. Though not shown graphically, due to the phase relation of voltages shown in the phasor diagram of FIG. 5, the currents $i_{u1}$, $i_{v11}$, $i_{w1}$ have phase differences of 120 degrees with each other, and the currents $i_{u2}$, $i_{v2}$, $i_{w2}$ have phase differences of 120 degrees with each other.

Figure 8:
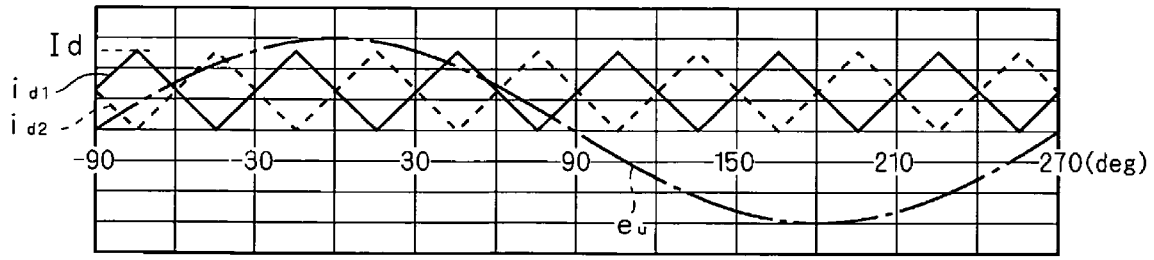
FIG. 8 is a graph illustrating the waveforms of first and second rectified currents.

FIG. 8 is a graph illustrating the waveforms of the first rectified current $i_{d1}$ and the second rectified current $i_{d2}$ together with the voltage $e_u$. The first rectified current $i_{d1}$ is obtained by applying full-wave rectification to the currents $i_{u1}$, $i_{v1}$, $i_{w1}$, and so it exhibits an approximately triangular wave that repeats in periods of 60 degrees in terms of the fundamental frequency of the voltage $e_u$. In other words, the fundamental frequency of the three-phase alternating currents $i_{u1}$, $i_{v1}$, $i_{w1}$ inputted to the input ends 31U, 31V, 31W of the first three-phase diode bridge 31 is 1/6 of the fundamental frequency of the first rectified current $i_{d1}$.

More accurately, the currents $i_{u1}$, $i_{v1}$, $i_{w1}$ have the waveforms shown by Expression (6), and so the waveform of the first rectified current $i_{d1}$ in a rising region exhibits a sine $\theta$ waveform in the section of $0 \le \theta \le \pi/6$, and the waveform in a falling region exhibits a sine $\theta$ waveform in the section of $5\pi/6 \le \theta \le \pi$. That is, it exhibits a waveform formed by combining a curve that is similar to the waveform that a sinusoidal wave exhibits from 0 degree to 30 degrees and a waveform that is left-right symmetrical to the curve. The same is true for the second rectified current $i_{d2}$. A near triangular waveform configured on the basis of a waveform commonly called "middle-phase", not a maximum phase nor a minimum phase of a sinusoidal wave, is herein referred to as a three-phase ac middle-phase waveform.

From Expressions (2), (3) and (6), the current $i_u$ is represented by Expression (7). This shows that the current $i_u$ contains the fundamental frequency component only. The same is true for the currents $i_v$ and $i_w$.

[Expression 7]

$$i_u = \frac{2I_m}{\cos\frac{\pi}{12}} \cos\omega t = \sqrt{2} I_{rms} \cos\omega t \quad (7)$$

Where $$I_m = \frac{I_d}{\sqrt{3}}, \quad I_{rms} = \frac{\sqrt{2} I_m}{\cos\frac{\pi}{12}} = 0.845 I_d$$

FIG. 9 is a graph illustrating the waveform obtained by obtaining the current $i_{wv}$ from Expressions (2) and (6). FIG. 10 is a graph illustrating the waveforms of currents ($i_{u1}+i_{u2}$), ($-i_{uw}+i_{vu}$), $i_u$ obtained from Expressions (2), (3), (6) and (7).

Now, as described above, the rectified currents $i_{d1}$ and $i_{d2}$ are close to a triangular wave, and so it is possible to receive these currents respectively from the three-phase diode bridges 31 and 32, with the chopper operations of the choppers 41 and 42. It is thus possible to input the currents $i_{u1}$, $i_{v1}$, $i_{w1}$, $i_{u2}$, $i_{v2}$, $i_{w2}$ from the three-phase transformer 2 to the three-phase diode bridges 31 and 32, and it is possible for the three-phase transformer 2 to remove harmonic components of the currents $i_u$, $i_v$, $i_w$.

Then, next, an example configuration for the chopper operations of the choppers 41 and 42 for receiving of the rectified currents $i_{d1}$ and $i_{2d}$ will be described. An example that obtains desired waveforms by pulse width modulation will be described.

Figure 11:
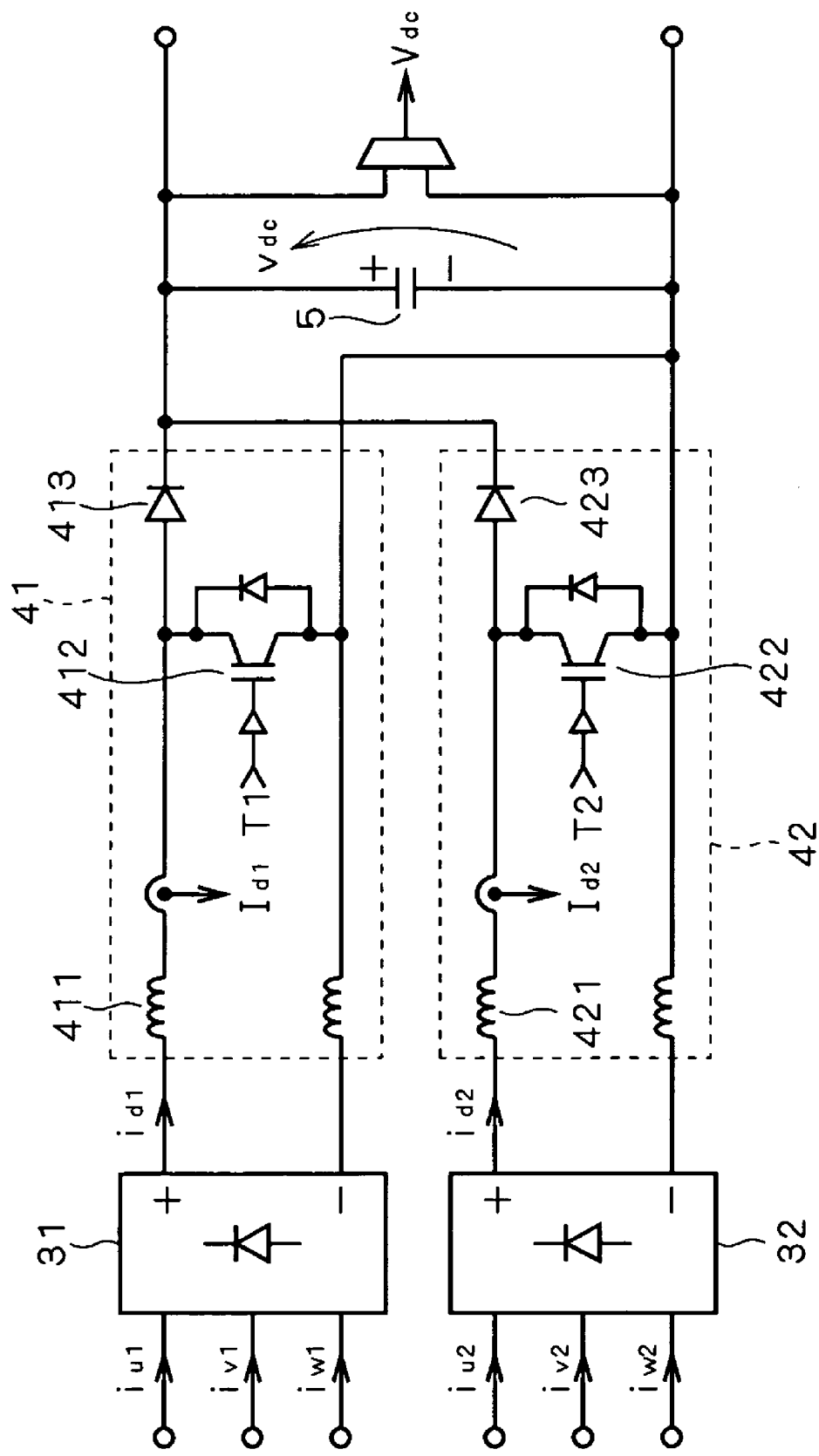
FIG. 11 is a circuit diagram illustrating parts of the configuration shown in FIG. 1.

FIG. 11 is a circuit diagram illustrating parts of the configuration shown in FIG. 1, showing parts for obtaining parameters on which the control of the chopper operations is based. Specifically, the values of the rectified currents $i_{d1}$ and $i_{d2}$ flowing respectively through the inductors 411 and 421 are detected respectively as data $I_{d1}$ and data $I_{d2}$, and the value of the both-end voltage $v_{dc}$ of the smoothing capacitor 5 is detected as data $V_{dc}$. Signals T1 and T2 for controlling the turning on/off of the IGBTs 412 and 422 are given to the gates of the IGBTs 412 and 422 through the buffers shown with triangular signs in the diagram.

Figure 12:
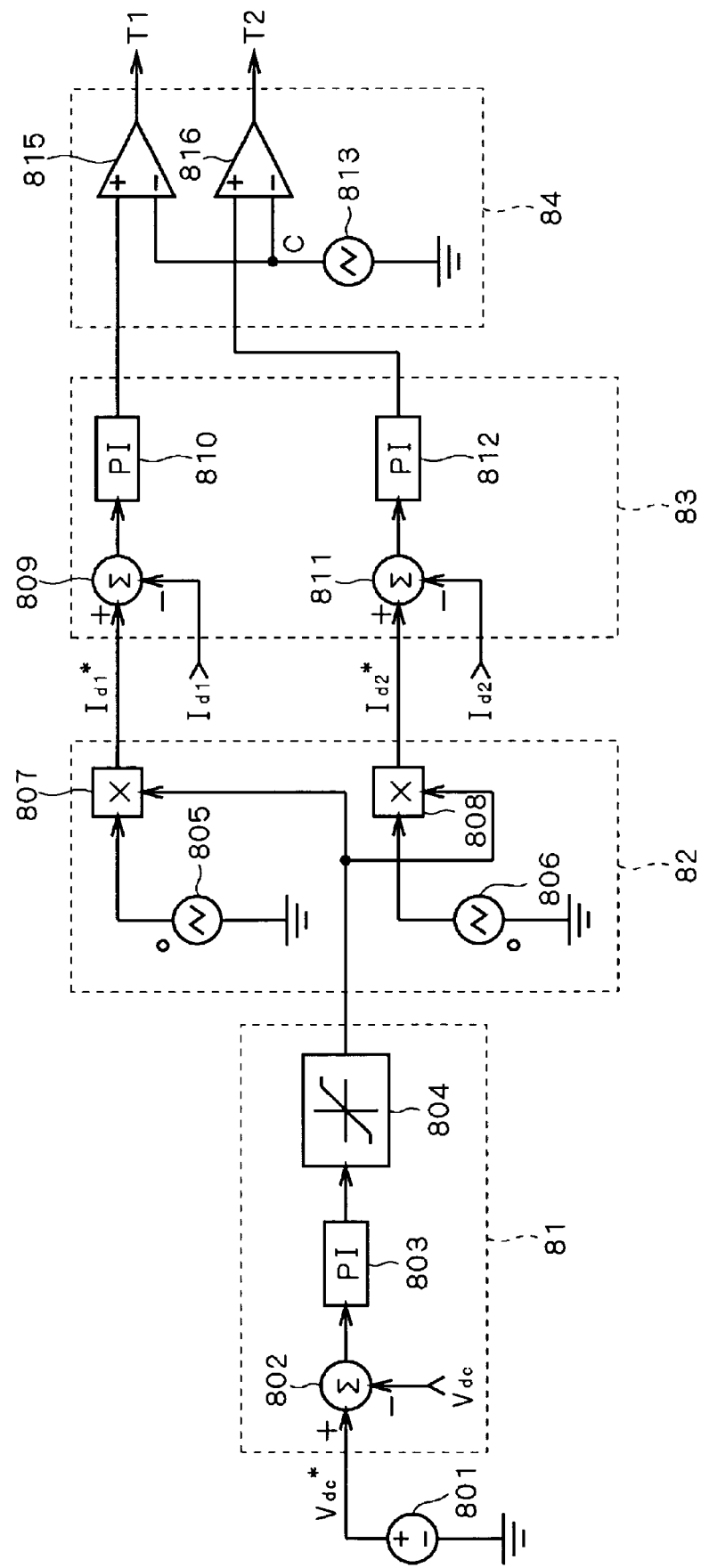
FIG. 12 is a circuit diagram illustrating a configuration for generating signals on the basis of data pieces.

FIG. 12 is a circuit diagram illustrating a configuration for generating the signals T1 and T2 on the basis of the data $I_{d1}$, $I_{d2}$, and $V_{dc}$. This configuration can be roughly divided into a voltage control block 81, a current command generating block 82, a current control block 83, and a PWM modulation block 84.

A voltage command generator 801 obtains a voltage command value $V_{dc}^*$ corresponding to a desired both-end voltage $V_{dc}$, which is inputted to the voltage control block 81 together with the data $V_{dc}$. In the voltage control block 81, an operator 802 obtains a difference between the voltage command value $V_{dc}^*$ and the data $V_{dc}$, which is outputted to the current command generating block 82 through the processings in a PI controller 803 and a limiter 804.

The current command generating block 82 includes waveform generators 805 and 806 for generating three-phase ac middle-phase waveforms, both of which generate a three-phase ac middle-phase waveform. However, the waveforms generated by the waveform generators 805 and 806 are in opposite phase to each other. FIG. 12 shows this opposite phase relation with the circles located in different positions near the waveform generators 805 and 806 (this sign does not indicate the inversion of polarity). The three-phase ac middle-phase waveforms generated by the waveform generators 805 and 806 have a frequency that is six times the fundamental frequency of the three-phase voltages $e_u$, $e_v$, $e_w$ (accordingly, of the currents $i_{u1}$, $i_{v1}$, $i_{w1}$, $i_{u2}$, $i_{v2}$, $i_{w2}$), and so they can be grasped as having a mutual phase difference of 30 degrees, with reference to the fundamental frequency.

In the current command generating block 82, the output of the voltage command generator 801 is inputted to a multiplier 807 and multiplied with the output of the waveform generator 805. Similarly, the output of the voltage command generator 801 is inputted to a multiplier 808 and multiplied with the output of the waveform generator 806. The results of multiplication are outputted to the current control block 83 respectively as current command values $I_{d1}^*$ and $I_{d2}^*$ about the rectified currents $i_{d1}$ and $i_{d2}$.

In the current control block 83, an operator 809 obtains a difference between the current command value $I_{d1}^*$ and the data $I_{d1}$, which is outputted to the PWM modulation block 84 through the processing in a PI controller 810. Similarly, an operator 811 obtains a difference between the current command value $I_{d2}^*$ and the data $I_{d2}$, which is outputted to the PWM modulation block 84 through the processing in a PI controller 812.

The PWM modulation block 84 includes a carrier generator 813 for generating a modulation carrier C and differential amplifiers 815 and 816. The differential amplifier 815 is provided with the modulation carrier C and the output of the PI controller 810, and generates the signal T1. The differential amplifier 816 is provided with the modulation carrier C and the output of the PI controller 812, and generates the signal T2. The signals T1 and T2 control on/off of the IGBTs 412 and 422 such that rectified currents $i_{d1}$ and $i_{d2}$ corresponding to the current command values $I_{d1}^*$ and $I_{d2}^*$ flow and a both-end voltage $V_{dc}$ corresponding to the voltage command value $V_{dc}^*$ is generated in the smoothing capacitor 5, whereby the operations of the choppers 41 and 42 are controlled.

Second Preferred Embodiment

Figure 13:
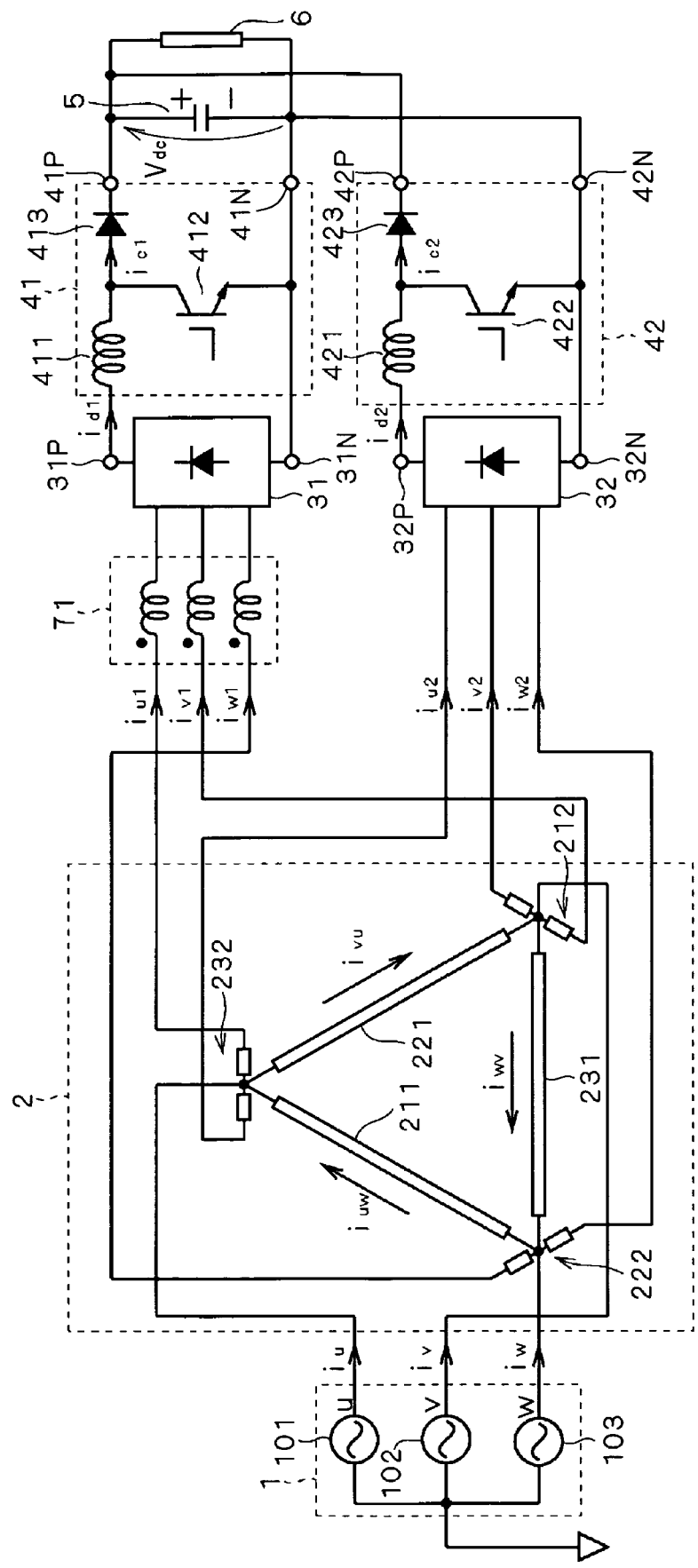
FIG. 13 is a circuit diagram used to describe a second preferred embodiment of the present invention.

FIG. 13 is a circuit diagram used to describe a second preferred embodiment of the present invention. The configuration illustrated here differs from the configuration of the first preferred embodiment in that an interphase reactor 71 is additionally interposed between the three-phase transformer 2 and the first three-phase diode bridge 31.

When explained by referring to FIGS. 2 and 4, the input ends 31U, 31V, 31W of the first three-phase diode bridge 31 are connected respectively to the secondary windings 2321, 2121, 2221, each through one interphase reactor. That is, the three-phase currents $i_{u1}$, $i_{v1}$, $i_{w1}$ flow in the interphase reactor 71.

Though not described in the first preferred embodiment, zero-phase voltage is generally generated between a neutral point on the input side of a three-phase diode bridge and an intermediate potential on the output side. This voltage is a triple component of the fundamental frequency of the three-phase voltage on the input side. When explained by referring to FIGS. 2 and 5, in the first three-phase diode bridge 31, zero-phase voltage is generated at a frequency of ½ of the fundamental frequency of the first rectified current $i_{d1}$, between the neutral point potential of the three-phase voltages $e_{u1}$, $e_{v1}$, $e_{w1}$ given respectively to the input ends 31U, 31V, 31W and the intermediate potential of the voltage applied between the output ends 31P and 31N. Zero-phase voltage is similarly generated in the second three-phase diode bridge 32.

When parallel-connected multiple rectifier circuitry is adopted as in the present invention, and when the two neutral points are not insulated on the side supplying the two sets of three-phase currents inputted to the rectifier circuits, then current due to the zero-phase voltage is generated (hereinafter referred to as "zero-phase current"). This is because the three-phase currents become unbalanced with the generation of zero-phase voltage.

In this preferred embodiment, as can be seen from FIG. 4, the three-phase transformer 2 adopts the autotransformers 21, 22 and 23, and so the neutral points of the three-phase voltages $e_{u1}$, $e_{v1}$, $e_{w1}$ and the three-phase voltages $e_{u2}$, $e_{v2}$, $e_{w2}$ (see FIG. 5) respectively corresponding to the three-phase currents $i_{u1}$, $i_{v1}$, $i_{w1}$ and the three-phase currents $i_{u2}$, $i_{v2}$, $i_{w2}$ are common.

Accordingly, it is desirable to cut the zero-phase current by adopting the interphase reactor 71 to provide large impedance for the imbalance of the three-phase currents.

Figure 14:
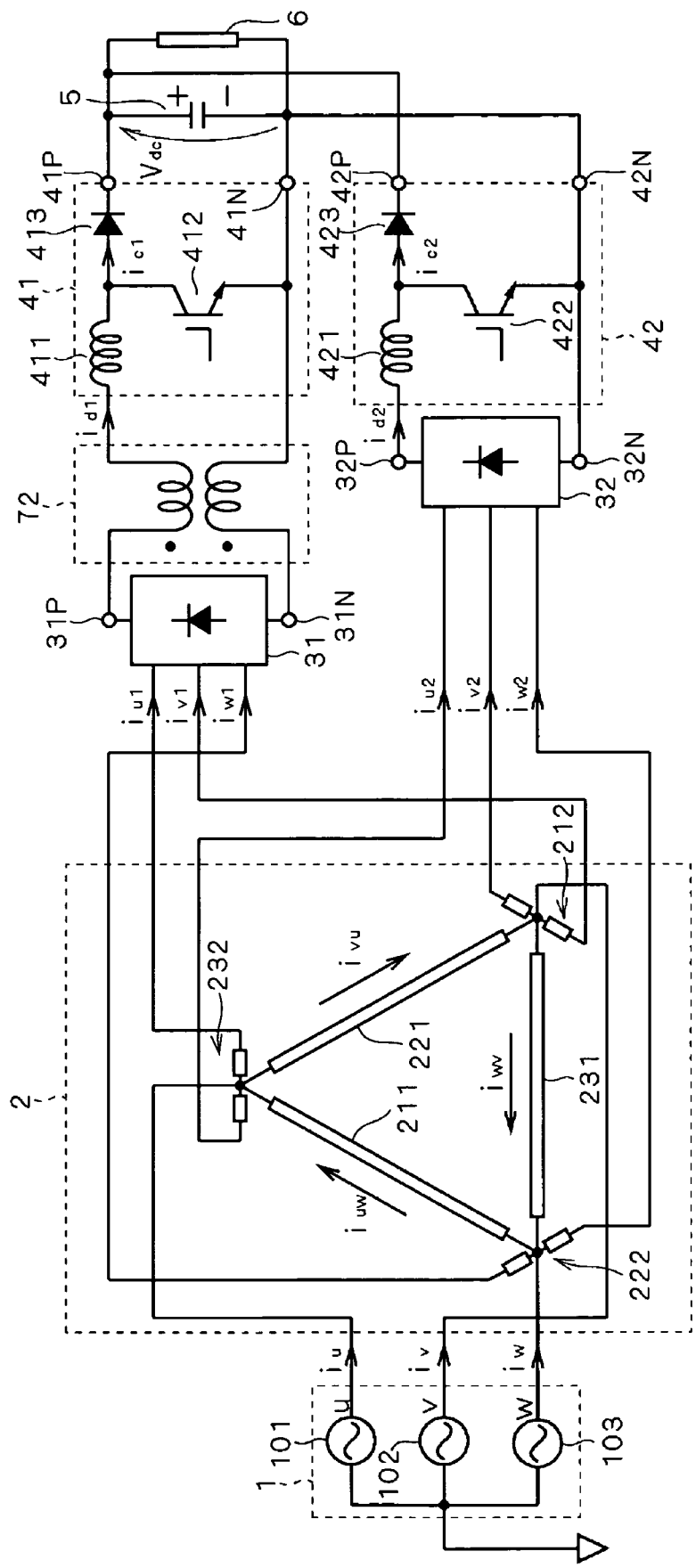
FIG. 14 is a circuit diagram illustrating a modification of the second preferred embodiment of the present invention.

FIG. 14 is a circuit diagram illustrating a modification of this preferred embodiment, where an interphase reactor 72 is provided between the first three-phase diode bridge 31 and the first chopper 41. Thus, the first rectified current $i_{d1}$ flows through the interphase reactor 72. More specifically, the first rectified current $i_{d1}$ flows in a reactor interposed between the output end 31P of the first three-phase diode bridge 31 and the inductor 411 of the first chopper 41. A reactor is provided also between the output end 31N of the first three-phase diode bridge 31 and the emitter of the IGBT 412.

It is desirable to provide the interphase reactor 72 located in this position because it cuts the zero-phase current in the same way as the interphase reactor 71.

The interphase reactors 71 and 72 described above are both provided for the first three-phase diode bridge 31, but they may be provided for the second three-phase diode bridge 32 on its input side or output side.

Third Preferred Embodiment

Figure 15:
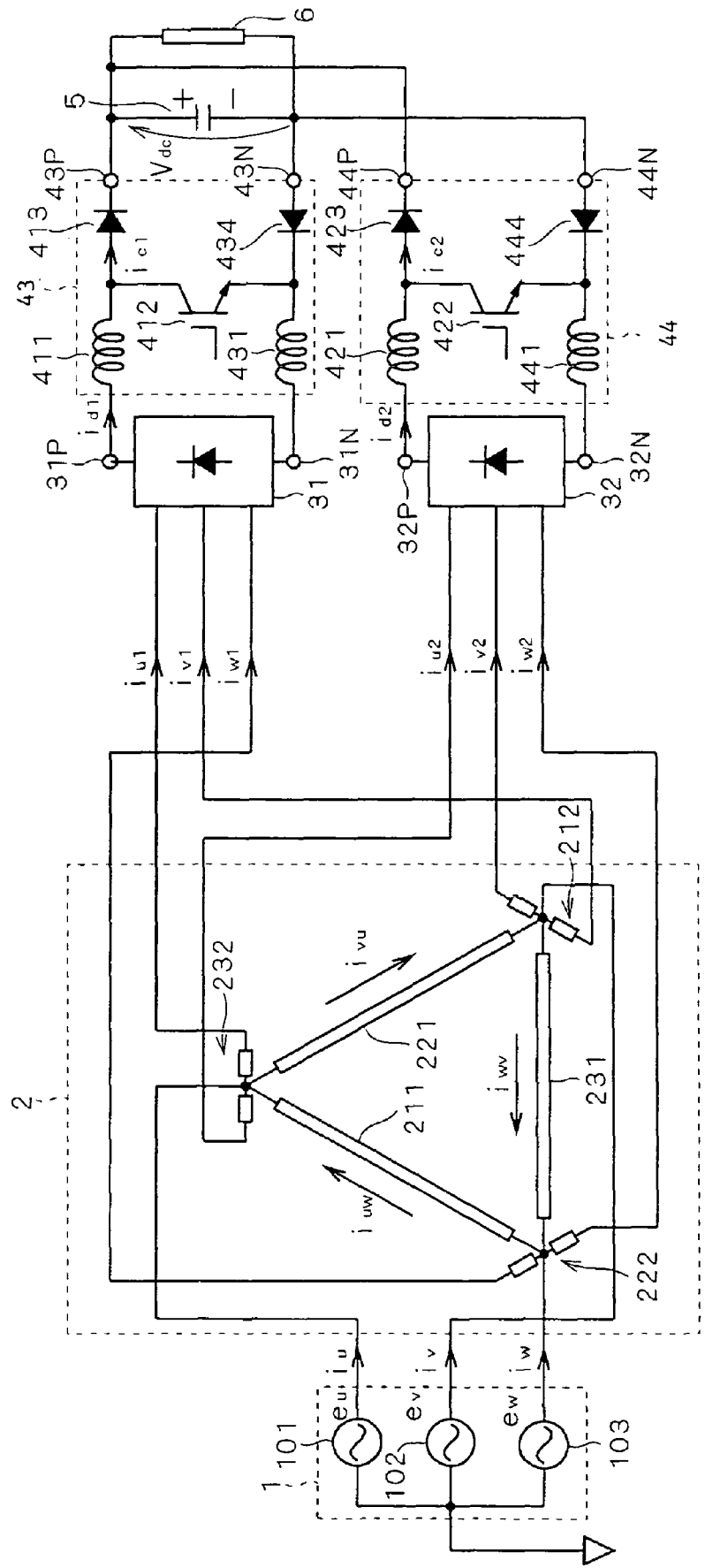
FIG. 15 is a circuit diagram used to describe a third preferred embodiment of the present invention.

FIG. 15 is a circuit diagram used to describe a third preferred embodiment of the present invention. The configuration shown here differs from the configuration of the first preferred embodiment in that the first chopper 41 and the second chopper 42 are replaced respectively by a first chopper 43 and a second chopper 44.

As compared with the first chopper 41, the first chopper 43 additionally includes an inductor 431 and a diode 434. More specifically, the inductor 431 is interposed between the output end 31N of the first three-phase diode bridge 31 and the emitter of the IGBT 412. Also, the diode 434 has its anode connected to the output end 43N, and its cathode connected to the emitter of the IGBT 412. The second chopper 44, too, includes an inductor 441 and a diode 444 that are connected in the same way as the inductor 431 and the diode 434.

With this configuration, in the first chopper 43 and the second chopper 44, it is also possible to control the currents flowing to the negative side of the first three-phase diode bridge 31 and to the negative side of the second three-phase diode bridge 32, and no zero-phase current flows. This eliminates the need for an interphase reactor.

Fourth Preferred Embodiment

When pulse width modulation is adopted in order to obtain desired waveforms of the rectified currents $i_{d1}$ and $i_{d2}$ as described in the first preferred embodiment, ripple due to the modulation carrier C is superimposed on the rectified currents $i_{d1}$ and $i_{d2}$. This causes ripple in the currents $i_{u1}$, $i_{v1}$, $i_{w1}$, $i_{u2}$, $i_{v2}$, $i_{w2}$, and further in the three-phase currents $i_u$, $i_v$, $i_w$. Accordingly, this preferred embodiment describes a scheme for reducing the ripple due to the carrier C.

Figure 16:
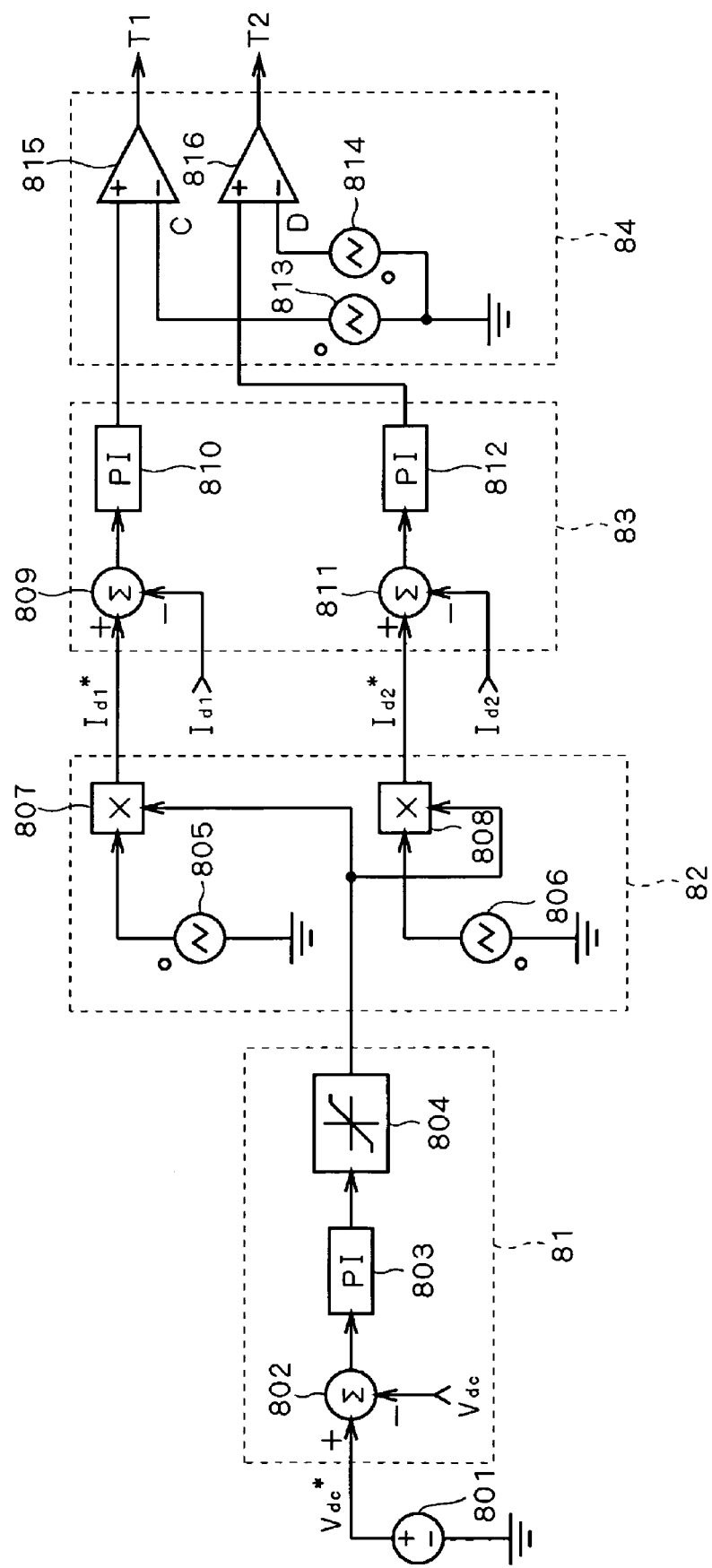
FIG. 16 is a circuit diagram illustrating a configuration for generating signals on the basis of data pieces in a fourth preferred embodiment of the present invention.

FIG. 16 is a circuit diagram illustrating a configuration adopted in this preferred embodiment and for generating the signals T1 and T2 on the basis of the data $I_{d1}$, $I_{d2}$ and $V_{dc}$. Unlike the PWM modulation block 84 of the first preferred embodiment described with FIG. 12, the differential amplifier 816 of this preferred embodiment is provided not with the carrier C but with a carrier D that is in opposite phase relative to the carrier C. The carrier D is generated by a carrier generator 814.

That is, in this preferred embodiment, the operation of the first chopper 41 is controlled by pulse width modulation on the basis of the carrier C, and the operation of the second chopper 42 is controlled by pulse width modulation on the basis of the carrier D having the same carrier frequency as, and in opposite phase to, the carrier C. This cancels the ripple having the carrier frequency in the rectified currents $i_{d1}$ and $i_{d2}$.

Figure 17:
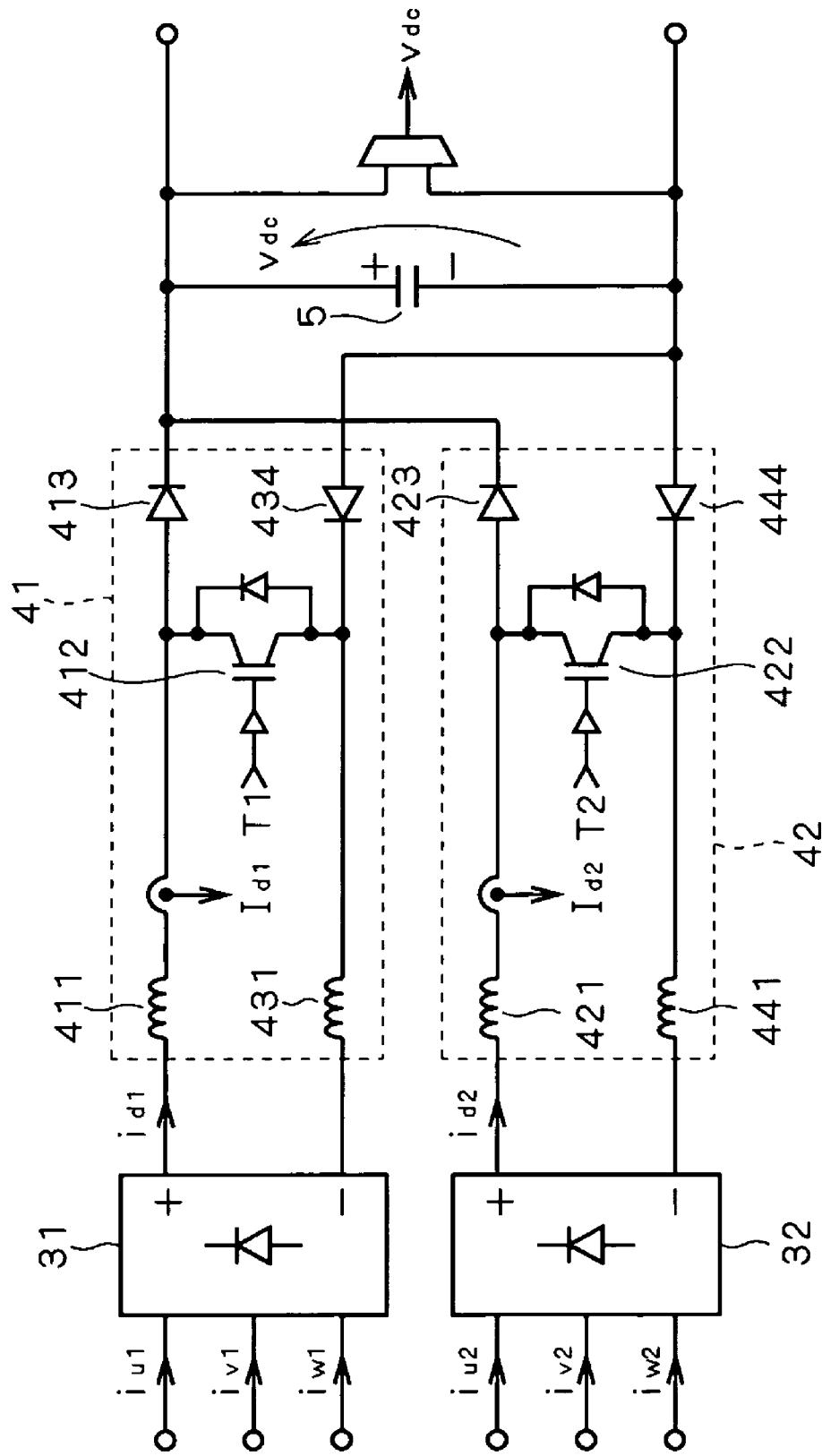
FIG. 17 is a circuit diagram illustrating the acquisition of data conducted when a circuit described in the third preferred embodiment of the invention is used.

FIG. 17 is a circuit diagram illustrating the acquisition of the data $I_{d1}$, $I_{d2}$ and $V_{dc}$ when the circuit described in the third preferred embodiment is adopted, which corresponds to FIG. 11.

Figure 18:
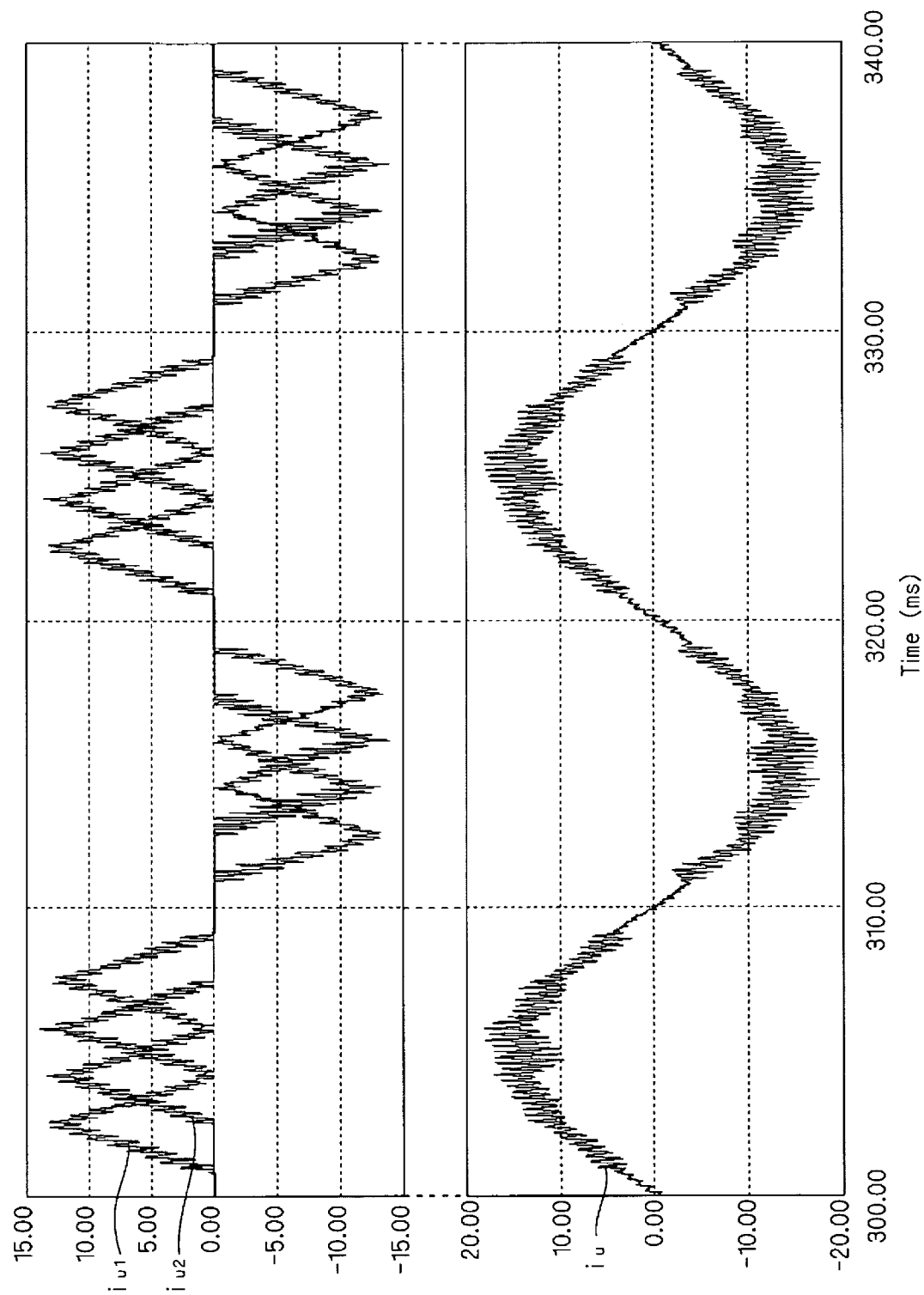
FIG. 18 is a graph illustrating current values exhibited when the configuration shown in FIG. 12 and the configuration of FIG. 17 are used.
Figure 19:
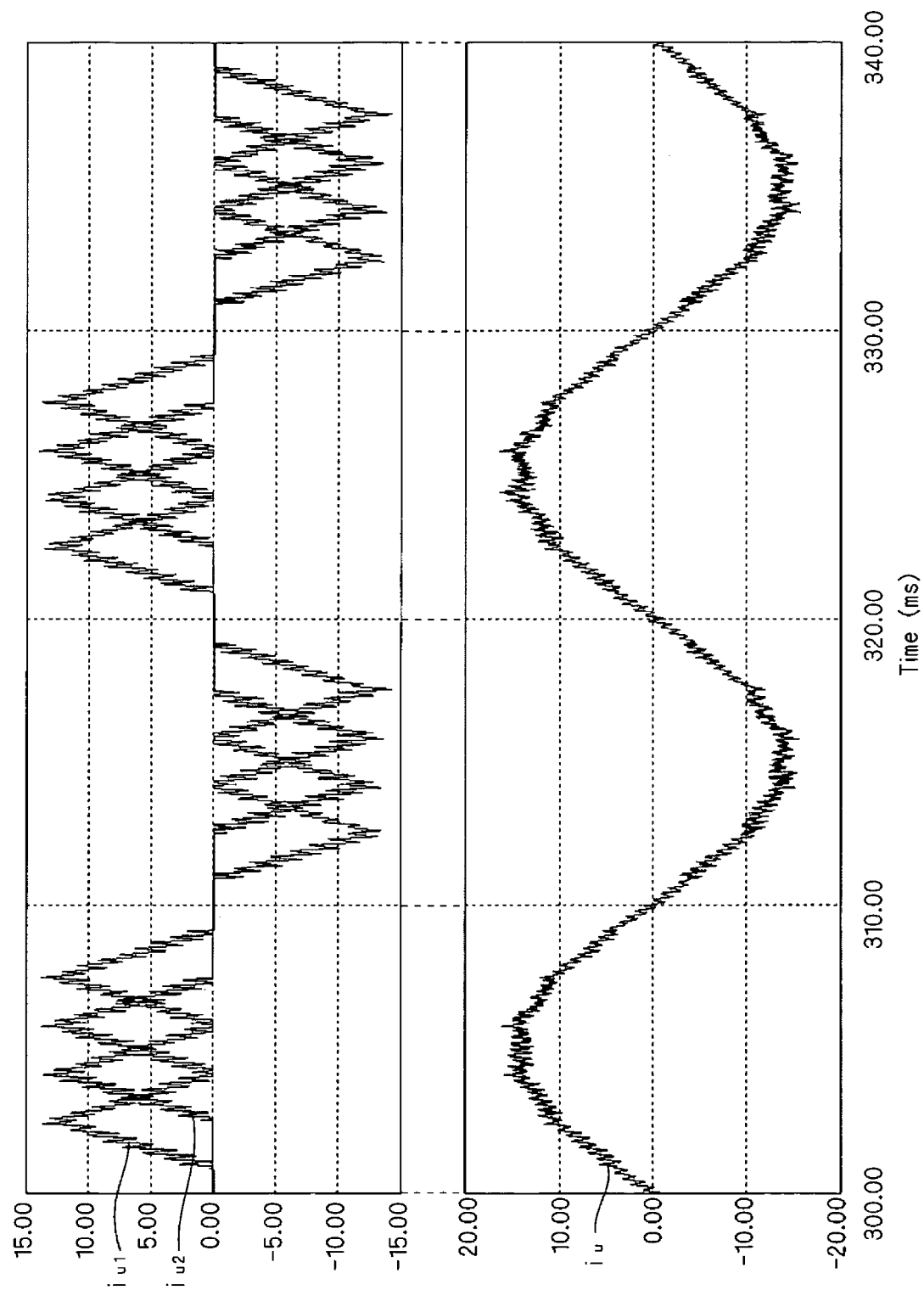
FIG. 19 is a graph illustrating current values exhibited when the configuration shown in FIG. 16 and the configuration of FIG. 17 are used.

FIG. 18 is a graph illustrating the values of the currents $i_{u1}$, $i_{u2}$ and $i_u$ exhibited when the configuration exhibited in FIG. 12 and the configuration exhibited in FIG. 17 are used. FIG. 19 is a graph illustrating the values of the currents $i_{u1}$, $i_{u2}$ and $i_u$ exhibited when the configuration exhibited in FIG. 16 and the configuration exhibited in FIG. 17 are used. The graph of FIG. 19 shows that the ripple is reduced as compared with the graph of FIG. 18.

Figure 20:
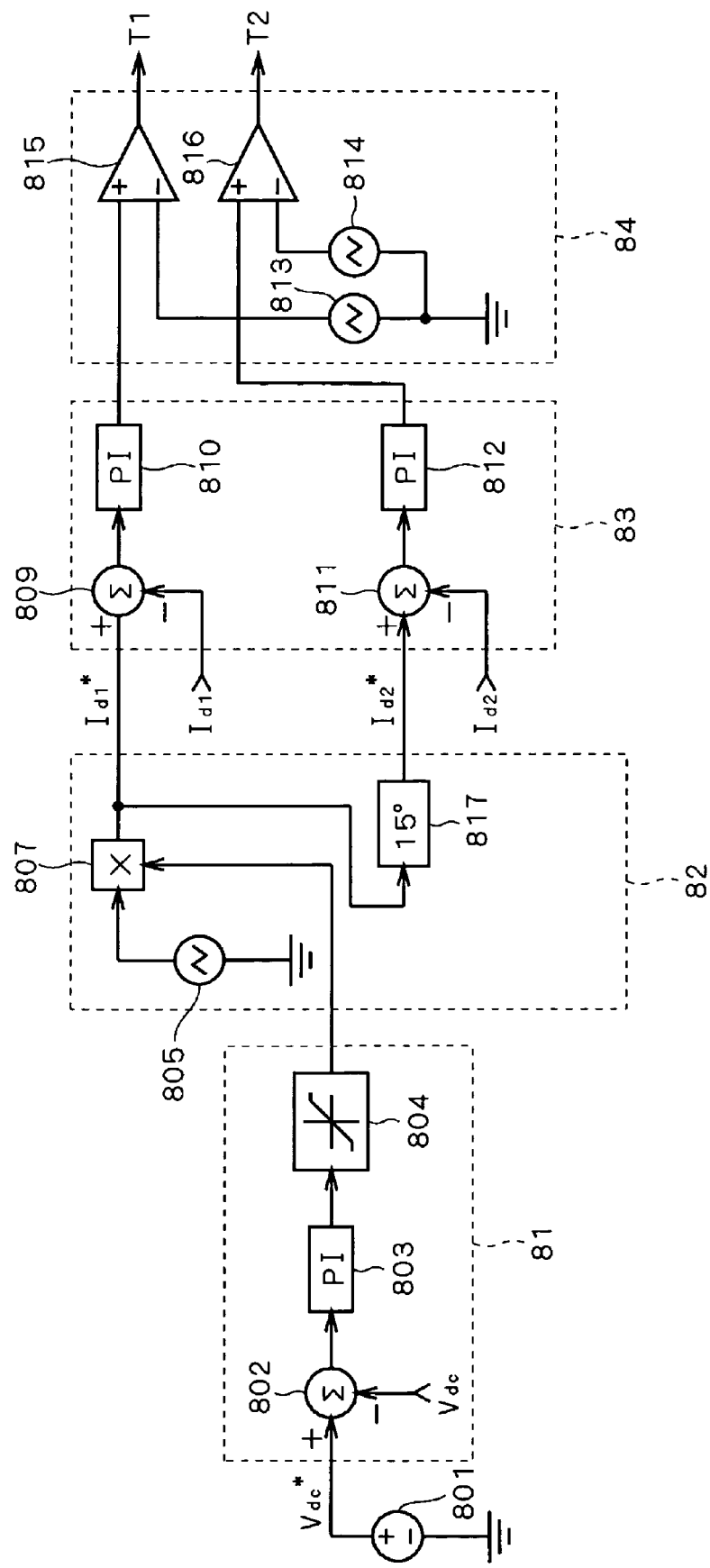
FIG. 20 is a circuit diagram illustrating a modification of the fourth preferred embodiment of the present invention.

FIG. 20 is a circuit diagram illustrating a modification of this preferred embodiment, which is a circuit diagram illustrating a configuration for generating the signals T1 and T2 on the basis of the data $I_{d1}$, $I_{d2}$ and $V_{dc}$. Unlike the configuration described with FIG. 16, the waveform generator 806 and the multiplier 808 are omitted in the current command generating block 82, and a phase shifter 817 is additionally provided. The phase shifter 817 shifts by 15 degrees the phase of the current command value $I_{d1}$* outputted by the multiplier 807. Then, the phase shifter 817 outputs a current command value $I_{d2}$* that is in opposite phase to the current command value $I_{d1}$*.

With this configuration, the signals T1 and T2 are generated in the same way as in the configuration of FIG. 12 when the carrier generator 814 generates the same carrier C as the carrier generator 813 and PWM modulation is performed. In this case, the carrier generator 814 can be merged with the carrier generator 813 as in FIG. 12.

When the carrier generator 814 generates the carrier D in opposite phase to the carrier generator 813 and PWM modulation is performed, the signals T1 and T2 are generated in the same way as in the configuration of FIG. 16, and the ripple having the carrier frequency is canceled in the rectified currents $i_{d1}$ and $i_{d2}$.

Modifications

The description above has shown examples in which the three-phase currents $i_{u1}$, $i_{v1}$, $i_{w1}$ lead in phase by 30 degrees with respect to the three-phase currents $i_{u2}$, $i_{v2}$, $i_{w2}$, but the present invention can be constituted in the same way also when they lag in phase.

Also, three-phase ac middle-phase waveforms have been suggested as the first rectified current $i_{d1}$, and the second rectified current $i_{d2}$, but ordinary triangular waves may be used instead. In this case, the choppers 41 to 44 can be controlled easily.

Also, configurations adopting three autotransformers 21, 22 and 23 as the three-phase transformer 2 have been described, but the applications of the present invention are not limited thereto. A three-phase transformer may be adopted in which primary windings 211, 221, 231 and secondary windings 212, 222, 232 are coupled with each other. For example, it is possible to adopt a three-phase transformer having three primary windings 211, 221 and 231 and three secondary windings 212, 222, 232 coupled with them. The secondary windings 212, 222, 232 are all provided with center taps. The primary windings 211, 221, 231 are delta-connected, and the three center taps are individually connected to a connection point at which the primary windings 211 and 221 are connected together, a connection point at which the primary windings 221 and 231 are connected together, and a connection point at which the primary windings 231 and 232 are connected together. Such a three-phase transformer is illustrated in FIG. 7 of Non-Patent Document 2, for example.

While the invention has been described in detail, the foregoing description is in all aspects illustrative and not restrictive. It is understood that numerous other modifications and variations can be devised without departing from the scope of the invention.

The invention claimed is:

1. A three-phase rectifier device, comprising:
the rectifier circuit including
a first three-phase diode bridge having three input ends and a pair of output ends, said first three-phase diode bridge applying full-wave rectification to currents inputted to said input ends to obtain a first rectified current, and outputting said first rectified current from one of said output ends,
a first chopper having a pair of output ends, said first chopper performing a first chopper operation to receive a current having a first fundamental frequency of a first value as said first rectified current,
a second three-phase diode bridge having three input ends and a pair of output ends, said second three-phase diode bridge applying full-wave rectification to currents inputted to said input ends to obtain a second rectified current, and outputting said second rectified current from one of said output ends, and
a second chopper having a pair of output ends, said second chopper performing a second chopper operation to receive a current having the first fundamental frequency of the first value as said second rectified current, said pair of output ends of said first chopper and said pair of output ends of said second chopper being connected in parallel; and
a three-phase transformer that receives three-phase currents, the three-phase currents having a second fundamental frequency of a second value that is ⅙ of said first value and said three-phase currents having mutual phase differences of 120 degrees at the second fundamental frequency, and that outputs first three-phase alternating currents having phase differences of 15 degrees at the second fundamental frequency respectively from said three-phase currents, and that also outputs second three-phase alternating currents having phase differences of 30 degrees at the second fundamental frequency from said first three-phase alternating currents.

2. The rectifier circuit according to claim 1, further comprising an interphase reactor which is connected to said input ends of said first three-phase diode bridge and in which the currents inputted to said input ends flow.

3. The rectifier circuit according to claim 1, further comprising an interphase reactor which is connected between said first three-phase diode bridge and said first chopper and in which said first rectified current flows.

4. The rectifier circuit according to claim 1,
wherein said first chopper comprises:
a first inductor in which said first rectified current flows;
a first diode having an anode connected to said one of said output ends of said first three-phase diode bridge through said first inductor, and a cathode connected to one of said output ends of said first chopper;
a second inductor connected to the other of said output ends of said first three-phase diode bridge;
a second diode having a cathode connected to said other of said output ends of said first three-phase diode bridge through said second inductor, and an anode connected to the other of said output ends of said first chopper; and
a switching element having a first end connected to the anode of said first diode and a second end connected to the cathode of said second diode, said switching element opening/closing between said first end and said second end,
and wherein said second chopper comprises:
a third inductor in which said second rectified current flows;
a third diode having an anode connected to said one of said output ends of said second three-phase diode bridge through said third inductor, and a cathode connected to one of said output ends of said second chopper;
a fourth inductor connected to the other of said output ends of said second three-phase diode bridge;
a fourth diode having a cathode connected to said other of said output ends of said second three-phase diode bridge through said fourth inductor, and an anode connected to the other of said output ends of said second chopper; and
a switching element having a first end connected to the anode of said third diode and a second end connected to the cathode of said fourth diode, said switching element opening/closing between its said first end and said second end.

5. The rectifier circuit according to claim 1, wherein said first chopper and said second chopper are both step-up choppers.

6. The rectifier circuit according to claim 1, wherein said first chopper operation is controlled by pulse width modulation on the basis of a first modulation wave having a carrier frequency, and said second chopper operation is controlled by pulse width modulation on the basis of a second modulation wave having said carrier frequency and being in opposite phase to said first modulation wave.

7. The rectifier circuit according to claim 1, further comprising a smoothing capacitor connected in parallel to said output ends of said first chopper and said output ends of said second chopper.

8. The rectifier circuit according to claim 1,
wherein first three-phase alternating currents are inputted to said input ends of said first three-phase diode bridge, said first three-phase alternating currents having the second fundamental frequency of the second value that is ⅙ of said first value and said first three-phase alternating currents having mutual phase differences of 120 degrees at the second fundamental frequency, and
second three-phase alternating currents are inputted to said input ends of said second three-phase diode bridge, said second three-phase alternating currents having the second fundamental frequency of said second value and having mutual phase differences of 120 degrees at the second fundamental frequency,
and wherein there is a phase difference of 30 degrees at the second fundamental frequency between said first three-phase alternating currents and said second three-phase alternating currents,
and wherein said first three-phase alternating currents and said second three-phase alternating currents each have a waveform which:
(i) exhibits a crest in each of first and second sections both of which continue in correspondence with a phase length of 60 degrees at the second fundamental frequency;
(ii) exhibits a trough in each of continuous two 60-degree sections, in each of third and fourth sections both of which continue in correspondence with a phase length of 60 degrees at the second fundamental frequency; and (iii) exhibits a flatter form as compared with said crests and troughs, in each of fifth and sixth sections which correspond to a phase length of 60 degrees at the second fundamental frequency and which are separated by said first and second sections or by said third and fourth sections.

9. The rectifier circuit according to claim 1, wherein the waveform of each of said first three-phase alternating currents and said second three-phase alternating currents exhibits a triangular wave in said first to fourth sections.

10. The rectifier circuit according to claim 8, wherein, in said first to fourth sections, the waveform of each of said first three-phase alternating currents and said second three-phase alternating currents exhibits a waveform formed by combining a curve that is similar to a waveform that a sinusoidal wave exhibits from 0 degree to 30 degrees and a waveform that is left-right symmetrical to the curve.

* * * * *